United States Patent
Lee et al.

(10) Patent No.: US 12,323,666 B2
(45) Date of Patent: Jun. 3, 2025

(54) IMAGE DISPLAY APPARATUS AND OPERATING METHOD THEREOF

(71) Applicant: LG ELECTRONICS INC., Seoul (KR)

(72) Inventors: Hyeseung Lee, Seoul (KR); Seongwoon Seol, Seoul (KR); Obong An, Seoul (KR); Eunyoung Cho, Seoul (KR); Sangjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 18/012,872

(22) PCT Filed: Jun. 24, 2020

(86) PCT No.: PCT/KR2020/008211
§ 371 (c)(1),
(2) Date: Dec. 23, 2022

(87) PCT Pub. No.: WO2021/261612
PCT Pub. Date: Dec. 30, 2021

(65) Prior Publication Data
US 2023/0276099 A1    Aug. 31, 2023

(51) Int. Cl.
*H04N 21/4722* (2011.01)
*H04N 21/254* (2011.01)
(Continued)

(52) U.S. Cl.
CPC ....... *H04N 21/4722* (2013.01); *H04N 21/254* (2013.01); *H04N 21/26283* (2013.01); *H04N 21/42204* (2013.01); *H04N 21/4312* (2013.01)

(58) Field of Classification Search
CPC ............ H04N 21/4722; H04N 21/254; H04N 21/26283; H04N 21/42204
See application file for complete search history.

(56) References Cited

U.S. PATENT DOCUMENTS 8,635,639 B1 *   1/2014   Volovich ................ H04H 60/37
                                                                   725/50
2016/0021432 A1   1/2016   Cheron et al.
(Continued)

FOREIGN PATENT DOCUMENTS

EP    3 188 107 A1    7/2017
KR   10-1257913 B1    4/2013
(Continued)

*Primary Examiner* — Nnenna N Ekpo
(74) *Attorney, Agent, or Firm* — Birch, Stewart, Kolasch & Birch, LLP

(57) ABSTRACT

The present disclosure relates to an image display apparatus and an operating method thereof. The image display apparatus according to an embodiment of the present disclosure includes a display; a network interface unit that performs communication through a network; and a controller, wherein the controller checks an expected end time of content output through the display, obtains frame data for a screen output through the display at a first time point prior to a preset time from the expected end time, calculates an actual end time point of the content based on the obtained frame data, and outputs a user interface (UI) recommending at least one product related to the content, at the calculated actual end time point, through the display. Various other embodiments are possible.

18 Claims, 22 Drawing Sheets

(51) Int. Cl.
*H04N 21/262* (2011.01)
*H04N 21/422* (2011.01)
*H04N 21/431* (2011.01)

(56) References Cited

U.S. PATENT DOCUMENTS

2017/0244999 A1* 8/2017 Chen ................. G06F 16/24578
2019/0354608 A1* 11/2019 dePaz ................... G06F 16/783
2022/0165306 A1* 5/2022 Hamada ............. H04N 21/8456

FOREIGN PATENT DOCUMENTS

| KR | 10-1604193 B1 | 3/2016 |
| KR | 10-1756220 B1 | 7/2017 |
| KR | 10-2018-0102516 A | 9/2018 |
| WO | WO2017/146990 A1 | 8/2017 |

* cited by examiner ized. In addition, when information on a people or
IMAGE DISPLAY APPARATUS AND OPERATING METHOD THEREOF

CROSS REFERENCE TO RELATED APPLICATION

This application is the National Phase of PCT International Application No. PCT/KR2020/008211, filed on Jun. 24, 2020, which is hereby expressly incorporated by reference into the present application.

BACKGROUND

Technical Field

The present disclosure relates to an image display apparatus and an operating method thereof.

Discussion of the Related Art

An image display apparatus is a device having a function of displaying an image that a user can watch, and a user can watch a broadcast through the image display apparatus. For example, the image display apparatus may include a Television (TV), a monitor, a projector, and the like that have a liquid crystal display LCD using a liquid crystal or an OLED display using an organic light emitting diode OLED.

Recently, a digital TV service using a wired or wireless network communication network has become common, and the digital TV service provides various services that cannot be provided by an existing analog broadcasting service. Among them, an Electronic Program Guide (EPG) service is a service that provides a guide screen so that a user can watch broadcast information of various channels at a glance by disposing broadcast programs that are being aired or scheduled to be aired on each channel in chronological order.

Recently, a service that provides information on a person or product included in a specific screen of content output through an image display apparatus is also provided by using an electronic program guide (EPG). For example, a service in which information on a person or product is mapped to each time point of a corresponding timeline to form a database by using a timeline for a specific program included in an electronic program guide (EPG), and when a user requests information on a person or product included in a screen at a specific time point, the image display apparatus provides information on the person or product mapped at a corresponding time is provided.

However, due to the circumstances of a broadcasting company, there are frequent cases where an error occurs between the actual start time of a program and the previously scheduled start time. In this case, a screen scheduled to be output on the timeline of the electronic program guide (EPG) at a specific time point and a screen actually output through the image display apparatus may be different from each other. In addition, when information on a people or product mapped to each time point in the timeline of the electronic program guide EPG is provided on a screen along with a program, there may occur a problem that information on a people or product completely unrelated to a screen that a user is watching is displayed on the screen.

Meanwhile, it is common for users to focus on the story of a program while watching a program, and to search for information on a person or product appearing in the program after the program is terminated. However, in the case of a conventional service, it is common to provide information on a people or product mapped to each time point in the timeline of the electronic program guide EPG on a screen in real time while a user is watching a program. Accordingly, there is a problem in that the utilization of the conventional service is low, and as the preference of a user is not considered at all in providing information on a people or product, the user's satisfaction with the conventional service is low as well.

Technical Problem

The present disclosure has been made in view of the above problems, and provides an image display apparatus capable of accurately calculating an actual end time point of content, and providing information considering user's preference at the actual end time point of content, and an operating method thereof.

SUMMARY OF THE INVENTION

In an aspect, there is provided an image display apparatus unit, the apparatus including: a display; a network interface unit that performs communication through a network; and a controller, wherein the controller checks an expected end time of content output through the display, obtains frame data for a screen output through the display at a first time point prior to a preset time from the expected end time, calculates an actual end time point of the content based on the obtained frame data, and outputs a user interface (UI) recommending at least one product related to the content, at the calculated actual end time point, through the display.

In another aspect, there is provided a method of operating an image display apparatus, the method including: checking an expected end time of content output through a display of an image display apparatus, obtaining frame data for a screen output through the display at a first time point prior to a preset time from the expected end time, calculating an actual end time point of the content based on the frame data, and outputting a user interface (UI) recommending at least one product related to the content, at the calculated actual end time point, through the display.

Advantageous Effects

Effects of the image display apparatus and the operating method thereof according to the present disclosure will be described below.

According to various embodiments of the present disclosure, according to various embodiments of the present invention, even if an error occurs between a time point when the content is actually output and a time point that was previously scheduled in the timeline of the electronic program guide EPG, an image display apparatus may obtain frame data for a screen output through the display before a certain time from an expected end time scheduled according to the timeline of the electronic program guide EPG, and accurately calculate the actual end time point of the content, based on the frame data, thereby providing information to a user through the UI at an exact end time.

In addition, according to various embodiments of the present disclosure, a content-related recommendation criteria is generated based on a user's use history for the image display apparatus, thereby accurately providing information considering a user's preference.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

DETAILED DESCRIPTION OF THE EMBODIMENTS

Figure 1:
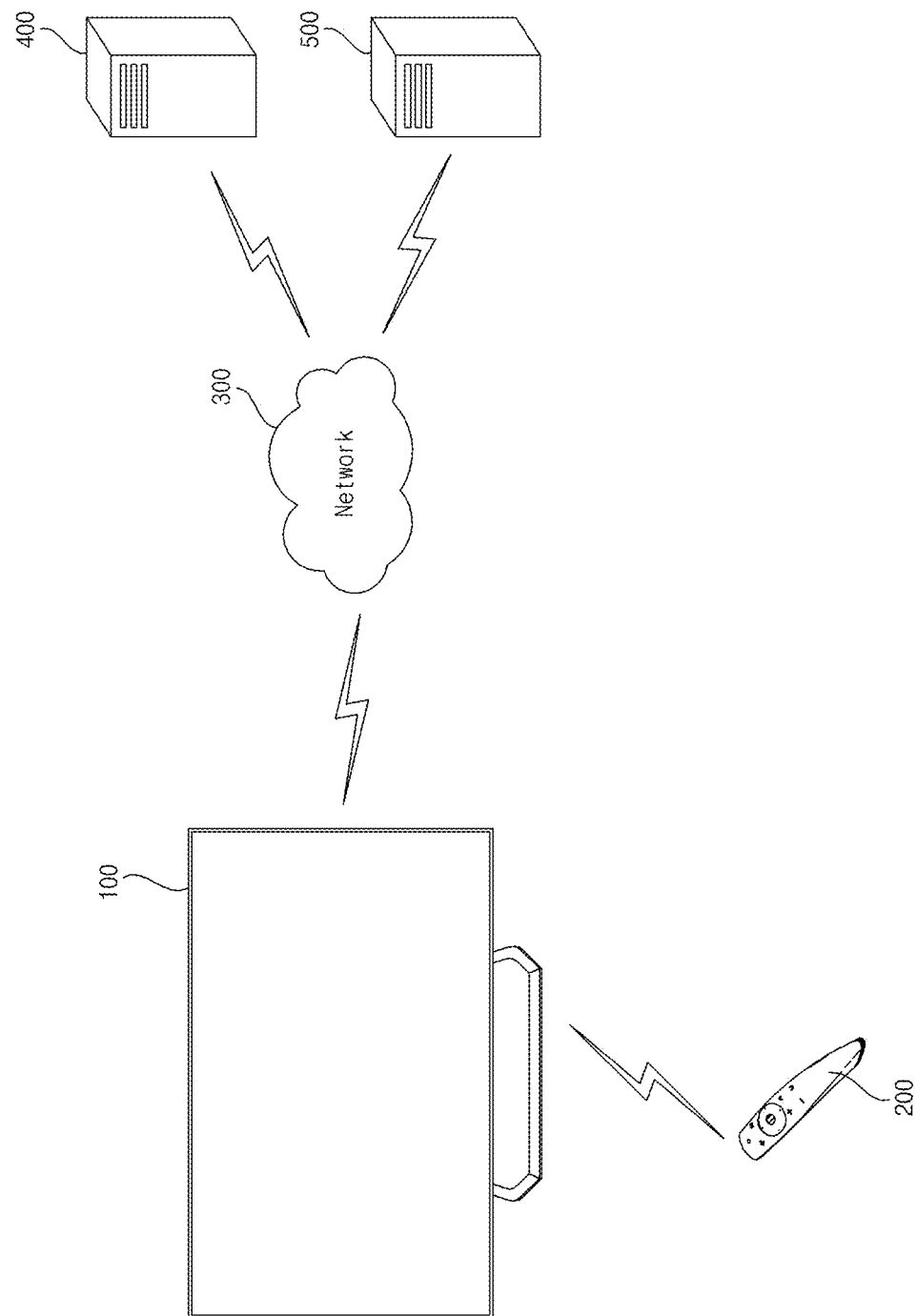
FIG. 1 is a diagram illustrating a system according to an embodiment of the present disclosure.

Reference will now be made in detail to the embodiments of the present disclosure, examples of which are illustrated in the accompanying drawings. To clearly and briefly describe the present disclosure, a part without concerning to the description is omitted in the drawings, and the same or like reference numerals in the specification denote the same elements.

The suffixes "module" and "unit" of elements herein are used for convenience of description and thus may be used interchangeably and do not have any distinguishable meanings or functions. Thus, the "module" and the "unit" may be interchangeably used.

Throughout this specification, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

It will be understood that, although the terms "first", "second", "third" etc. may be used herein to describe various elements, these elements should not be limited by these terms. These terms are only used to distinguish one element from another element.

FIG. 1 is a diagram illustrating a system, according to various embodiments of the present disclosure.

Referring to FIG. 1, a system 10 may include an image display apparatus 100, a remote control device 200, and/or at least one server 400, 500.

The image display apparatus 100 may be a device that processes and outputs an image. The image display apparatus 100 is not particularly limited as long as it can output a screen corresponding to an image signal, such as a TV, a notebook computer, and a monitor.

The image display apparatus 100 may receive a broadcast signal, process it, and output a signal-processed broadcast image. When the image display apparatus 100 receives a broadcast signal, the image display apparatus 100 may correspond to a broadcast receiving apparatus.

The image display apparatus 100 may receive a broadcast signal wirelessly through an antenna, or may receive a broadcast signal by wire through a cable. For example, the image display apparatus 100 may receive a terrestrial broadcast signal, a satellite broadcast signal, a cable broadcast signal, an Internet Protocol Television (IPTV) broadcast signal, and the like.

The remote control device 200 may be connected to the image display apparatus 100 by wire and/or wirelessly to provide various control signals to the image display apparatus 100. At this time, the remote control device 200 may include a device that establishes a wired or wireless network with the image display apparatus 100, and transmits various control signals to the image display apparatus 100 through the established network, or receives a signal related to various operations processed by the image display apparatus 100 from the image display apparatus 100.

For example, various input devices such as a mouse, a keyboard, a space remote control, a trackball, and a joystick may be used as the remote control device 200.

The image display apparatus 100 may be connected to only a single remote control device 200 or simultaneously connected to two or more remote control devices 200, thereby changing an object displayed on a screen or adjusting the state of a screen, based on a control signal provided from each remote control device 200.

The image display apparatus 100 may transmit and receive data to and from at least one server 400, 500 via a network 300 such as the Internet.

The server 400, 500 may transmit and receive data to and from the image display apparatus 100 through the network 300, and process data received from the image display apparatus 100.

The server 400, 500 may be located in the same or similar area or in areas separated from each other. For example, the server 400, 500 may be implemented in a single server, or may be implemented in a first server 400 and a second server 500 that are separated from each other.

Figure 2:
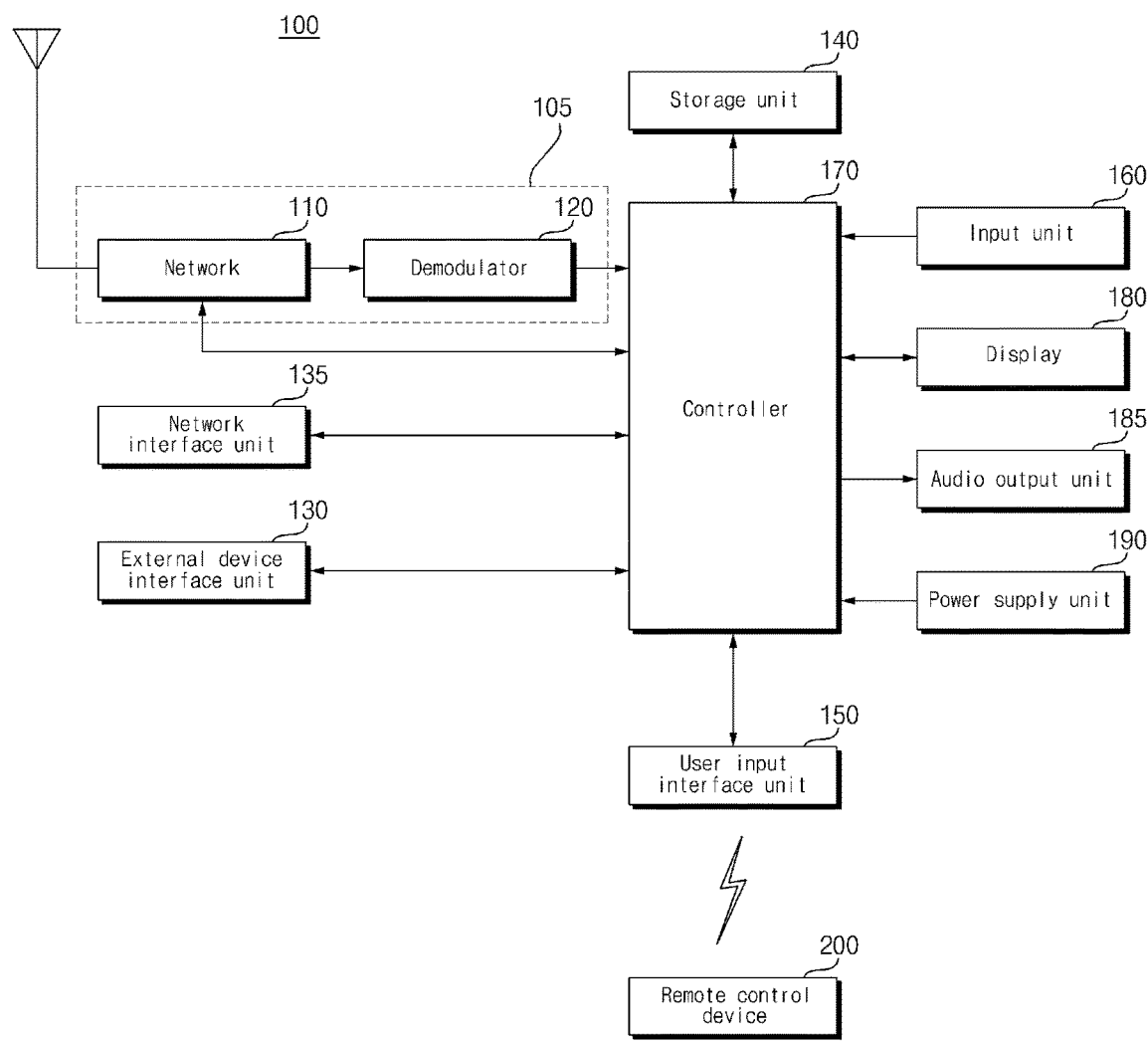
FIG. 2 is an example of an internal block diagram of an image display apparatus of FIG. 1.

FIG. 2 is an internal block diagram of the image display apparatus of FIG. 1.

Referring to FIG. 2, the image display apparatus 100 may include a broadcast receiving unit 105, an external device interface unit 130, a network interface unit 135, a storage unit 140, a user input interface unit 150, an input unit 160, a controller 170, a display 180, an audio output unit 185, and/or a power supply unit 190.

The broadcast receiving unit 105 may include a tuner unit 110 and a demodulator 120.

Meanwhile, unlike the drawing, it is also possible that the image display apparatus 100 includes only a broadcast receiving unit 105 and an external device interface unit 130, among the broadcast receiving unit 105, the external device interface unit 130, and the network interface unit 135. That is, the image display apparatus 100 may not include the network interface unit 135.

The tuner unit 110 may select a broadcast signal corresponding to a channel selected by a user or all pre-stored channels, among broadcast signals received through an antenna (not shown) or a cable (not shown). The tuner unit 110 may convert the selected broadcast signal into an intermediate frequency signal, a baseband image, or a voice signal.

For example, the tuner unit 110 may convert the selected broadcast signal into a digital IF signal (DIF) when the selected broadcast signal is a digital broadcast signal, and may convert the selected broadcast signal into an analog baseband image or voice signal (CVBS/SIF) when the selected broadcast signal is an analog broadcast signal. That is, the tuner unit 110 may process a digital broadcast signal or an analog broadcast signal. The analog baseband image or voice signal (CVBS/SIF) output from the tuner unit 110 may be directly input to the controller 170.

Meanwhile, the tuner unit 110 may sequentially select broadcast signals of all broadcast channels stored through a channel storage function among the received broadcast signals, and convert them into an intermediate frequency signal, a baseband image, or a voice signal.

Meanwhile, the tuner unit 110 may include a plurality of tuners in order to receive broadcast signals of a plurality of channels. Alternatively, a single tuner that simultaneously receives broadcast signals of a plurality of channels is also possible.

The demodulator 120 may receive the digital IF signal (DIF) converted by the tuner unit 110 and perform a demodulation operation.

The demodulator 120 may output a stream signal TS after performing demodulation and channel decoding. In this case, the stream signal may be a signal obtained by multiplexing an image signal, a voice signal, or a data signal.

The stream signal output from the demodulator 120 may be input to the controller 170. After performing demultiplexing and image/voice signal processing, the controller 170 may output an image through the display 180 and output a voice through the audio output unit 185.

The external device interface unit 130 may transmit or receive data with a connected external device. To this end, the external device interface unit 130 may include an A/V input/output unit (not shown).

The external device interface unit 130 may be connected to an external device such as a Digital Versatile Disk (DVD), Blu-ray, game device, camera, camcorder, computer (laptop), and set-top box, by wire/wireless, and may perform an input/output operation with the external device.

In addition, the external device interface unit 130 may receive a control signal related to the operation of the image display apparatus 100 from the remote control device 200, or may transmit data related to the operation of the image display apparatus 100 to the remote control device 200, by establishing a communication network with various remote control devices 200 as shown in FIG. 1.

The A/V input/output unit may receive image and voice signals from an external device. For example, the A/V input/output unit may include an Ethernet terminal, a USB terminal, a Composite Video Banking Sync (CVBS) terminal, a component terminal, an S-video terminal (analog), a Digital Visual Interface (DVI) terminal, a High a Definition Multimedia Interface (HDMI) terminal, a Mobile High-definition Link (MHL) terminal, a RGB terminal, a D-SUB terminal, an IEEE 1394 terminal, an SPDIF terminal, a Liquid HD terminal, and the like. A digital signal input through these terminals may be transmitted to the controller 170. In this case, the analog signal input through the CVBS terminal and the S-video terminal may be converted into a digital signal through an analog-to-digital converter (not shown) and transmitted to the controller 170.

The external device interface unit 130 may include a wireless communication unit (not shown) for short-range wireless communication with other electronic device. Through this wireless communication unit, the external device interface unit 130 may exchange data with an adjacent a mobile terminal. For example, the external device interface unit 130 may receive device information, executing application information, application image, and the like from a mobile terminal in a mirroring mode.

The external device interface unit 130 may perform short-range wireless communication by using Bluetooth, Radio Frequency Identification (RFID), Infrared Data Association (IrDA), Ultra-Wideband (UWB), ZigBee, and the like.

The network interface unit 135 may provide an interface for connecting the image display apparatus 100 to a wired/wireless network including an Internet network.

The network interface unit 135 may include a communication module (not shown) for connection with the wired/wireless network 300. For example, the network interface unit 135 may include a communication module for Wireless LAN (WLAN) (Wi-Fi), Wireless broadband (Wibro), World interoperability for microwave access (Wimax), High Speed Downlink Packet Access (HSDPA), and the like.

The network interface unit 135 may transmit or receive data with other user or other electronic device, through a connected network or other network linked to the connected network.

The network interface unit 135 may receive web content or data provided by a content provider or network operator. That is, the network interface unit 135 may receive web contents such as movie, advertisement, game, VOD, and broadcast signal provided from a content providers or network provider through a network, and information related thereto.

The network interface unit 135 may receive an update file and update information of firmware provided by a network operator, and transmit data to Internet or a content provider or a network operator.

The network interface unit 135 may select and receive a desired application from among applications open to the public, through a network.

The storage unit 140 may store a program for each signal processing and control in the controller 170, or may store a signal-processed image, voice, or data signal. For example, the storage unit 140 may store application programs designed for the purpose of performing various tasks that can be processed by the controller 170, and upon request of the controller 170, may selectively provide some of the stored application programs.

The program stored in the storage unit 140 is not particularly limited as long as it can be executed by the controller 170.

The storage unit 140 may perform a function for temporarily storing an image, voice, or data signal received from an external device through the external device interface unit 130.

The storage unit 140 may store information on a certain broadcast channel through a channel storage function such as a channel map.

The storage unit 140 may store various databases. For example, the storage unit 140 may include a database for content watched by a user, a database for a history (hereinafter, a use history) of using a UI for recommending products related to content, and the like.

FIG. 2 illustrates an embodiment in which the storage unit 140 is provided separately from the controller 170, but the scope of the present disclosure is not limited thereto, and the storage unit 140 may be included in the controller 170.

The storage unit 140 may include at least one of a volatile memory (e.g. DRAM, SRAM, SDRAM, etc.), a non-volatile memory (e.g. a flash memory, a hard disk drive (HDD), or a solid state drive (SSD), etc.). In various embodiments of the present disclosure, the storage unit 140 and the memory may be used interchangeably.

The user input interface unit 150 may transmit a signal input by a user to the controller 170, or may transmit a signal from the controller 170 to a user.

For example, the user input interface unit 150 may transmit/receive a user input signal such as power on/off, channel selection, and screen setting from the remote control device 200, may transmit a user input signal input from a local key (not shown) such as a power key, a channel key, a volume key, and a setting value to the controller 170, may transmit a user input signal input from a sensor unit (not shown) that senses a user's gesture to the controller 170, or may transmit a signal from the controller 170 to the sensor unit.

The input unit 160 may be provided in one side of the main body of the image display apparatus 100. For example, the input unit 160 may include a touch pad, a physical button, and the like.

The input unit 160 may receive various user commands related to the operation of the image display apparatus 100, and may transmit a control signal corresponding to the input command to the controller 170.

The input unit 160 may include at least one microphone (not shown), and may receive a voice through the microphone.

The controller 170 may include at least one processor, and may control the overall operation of the image display apparatus 100 by using the processor included therein. Here, the processor may be a general processor such as a central processing unit (CPU). Obviously, the processor may be a dedicated device such as an ASIC or other hardware-based processor.

The controller 170 may generate and output a signal for an image or voice output by demultiplexing a stream input through the tuner unit 110, the demodulator 120, the external device interface unit 130, or the network interface unit 135, or processing the demultiplexed signals.

The display 180 converts an image signal, a data signal, an OSD signal, a control signal processed by the controller 170, or an image signal, a data signal, and a control signal received from the external device interface unit 130 to generate a driving signal.

The display 180 may include a display panel (not shown) provided with a plurality of pixels.

The plurality of pixels provided in the display panel may include RGB sub-pixels. Alternatively, the plurality of pixels provided in the display panel may include a sub-pixel of RGBW. The display 180 may generate a driving signal for a plurality of pixels by converting an image signal, a data signal, an OSD signal, a control signal, etc. processed by the controller 170.

The display 180 may be a plasma display panel (PDP), a liquid crystal display (LCD), an organic light emitting diode (OLED), a flexible display, and the like, and a three-dimensional display (3D display) may be possible. The 3D display 180 may be divided into a non-glasses type and a glasses type.

Meanwhile, the display 180 may be configured as a touch screen, and used as an input device in addition to an output device.

The audio output unit 185 receives the voice-processed signal from the controller 170 and outputs it as a voice.

The image signal processed by the controller 170 may be input to the display 180 and displayed as an image corresponding to a pertinent image signal. In addition, the image signal processed by the controller 170 may be input to an external output device through the external device interface unit 130.

The voice signal processed by the controller 170 may be outputted as an audio to the audio output unit 185. In addition, the voice signal processed by the controller 170 may be input to an external output device through the external device interface unit 130.

Although not shown in FIG. 2, the controller 170 may include a demultiplexer, an image processor, a mixer, a frame rate conversion unit, a formatter, an audio processing unit, a data processing unit, and the like.

In addition, the controller 170 may control overall operations in the image display apparatus 100. For example, the controller 170 may control the tuner unit 110 to tune a channel selected by a user or a broadcast corresponding to a pre-stored channel.

The controller 170 may store image content received through the broadcast receiving unit 105, the external device interface unit 130, or the network interface unit 135 in an external storage medium. Here, the external storage medium may mean a device that is connected to the image display apparatus 100 in a wired/wireless manner through the external device interface unit 130, and transmits and receives data to/from the image display apparatus 100. For example, the controller 170 may transmit a broadcast signal received through the broadcast receiving unit 105 to an external storage medium through the external device interface unit 130.

In addition, the controller 170 may control the image display apparatus 100 according to a user command input through the user input interface unit 150 or an internal program.

Meanwhile, the controller 170 may control the display 180 to display an image. In this case, the image displayed on the display 180 may be a still image or a moving image, and may be a 2D image or a 3D image.

Meanwhile, the controller 170 may enable a certain 2D object to be displayed in the image displayed on the display 180. For example, the object may be at least one of an accessed web screen (newspaper, magazine, etc.), an electronic program guide (EPG), various menus, a widget, an icon, a still image, a moving picture, and a text.

Meanwhile, the image display apparatus 100 may further include a photographing unit (not shown). The photographing unit may photograph a user. The photographing unit may be implemented with a single camera, but is not limited thereto, and may be implemented with a plurality of cameras. Meanwhile, the photographing unit may be embedded in the image display apparatus 100 in the upper portion of the display 180 or may be disposed separately. Image information photographed by the photographing unit may be input to the controller 170.

The controller 170 may recognize the position of a user, based on the image photographed by the photographing unit. For example, the controller 170 may determine the distance (z-axis coordinate) between a user and the image display apparatus 100. In addition, the controller 170 may determine the x-axis coordinates and the y-axis coordinates in the display 180 corresponding to the user's position.

The controller 170 may detect the user's gesture based on each or a combination of an image photographed by the photographing unit or a signal sensed from the sensor unit.

The power supply unit 190 may supply a corresponding power throughout the image display apparatus 100. In particular, it may supply power to the controller 170 that can be implemented in the form of a system on chip (SOC), the display 180 for displaying an image, and the audio output unit 185 for outputting audio.

Specifically, the power supply unit 190 may include a converter (not shown) that converts AC power into DC power, and a Dc/Dc converter (not shown) that converts the level of DC power.

The remote control device 200 may transmit a user input to the user input interface unit 150. To this end, the remote control device 200 may use Bluetooth, Radio Frequency (RF) communication, Infrared Radiation communication, Ultra-wideband (UWB), ZigBee method, etc. In addition, the remote control device 200 may receive an image, voice, or data signal output from the user input interface unit 150, and display it in the remote control device 200 or output as a voice.

Meanwhile, the above-described image display apparatus 100 may be a digital broadcasting receiver capable of receiving a fixed type or mobile type digital broadcasting.

Meanwhile, the block diagram of the image display apparatus 100 shown in FIG. 2 is just a block diagram for an embodiment of the present disclosure, and each component of the block diagram may be incorporated, added, or omitted according to the specifications of the image display apparatus 100 actually implemented.

That is, two or more components may be combined into a single component, or a single component may be subdivided into two or more components as needed. In addition, the function performed in each block is for explaining the embodiment of the present disclosure, and a specific operation or device does not limit the scope of the present disclosure.

Figure 3A:
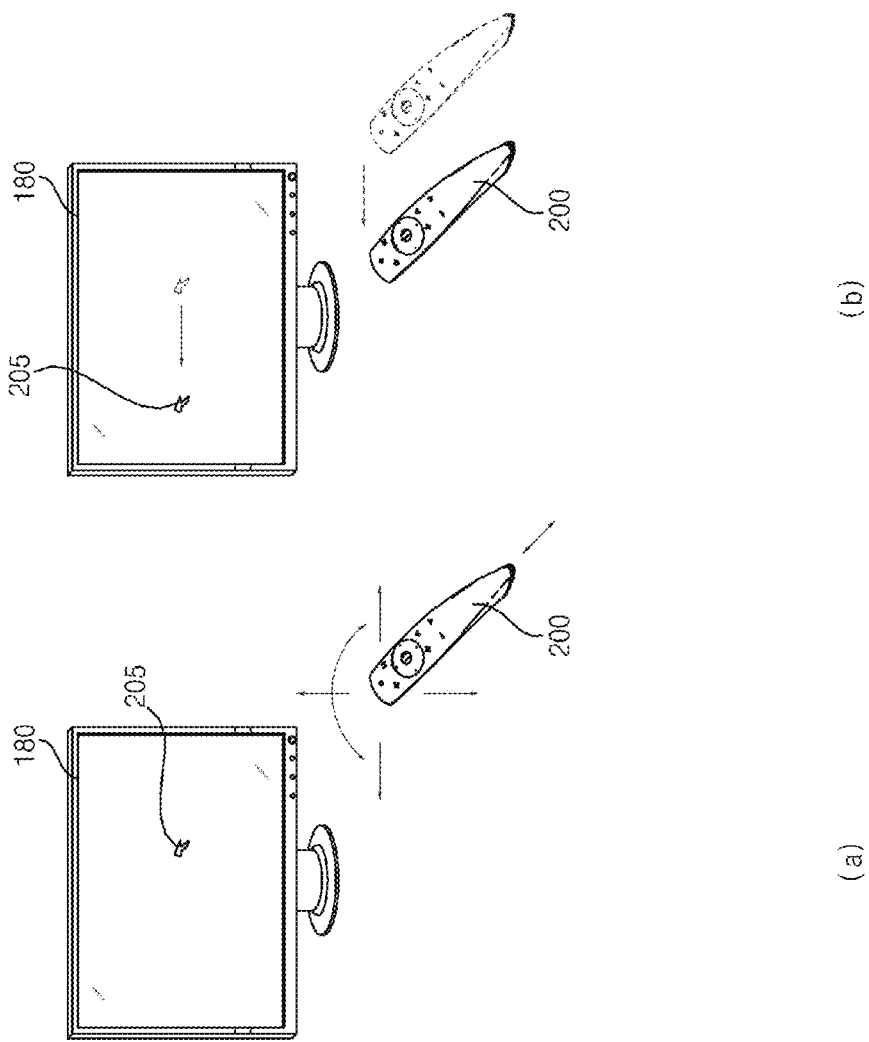
FIG. 3A is a diagram illustrating a control method of a remote control device of FIG. 2.
Figure 3B:
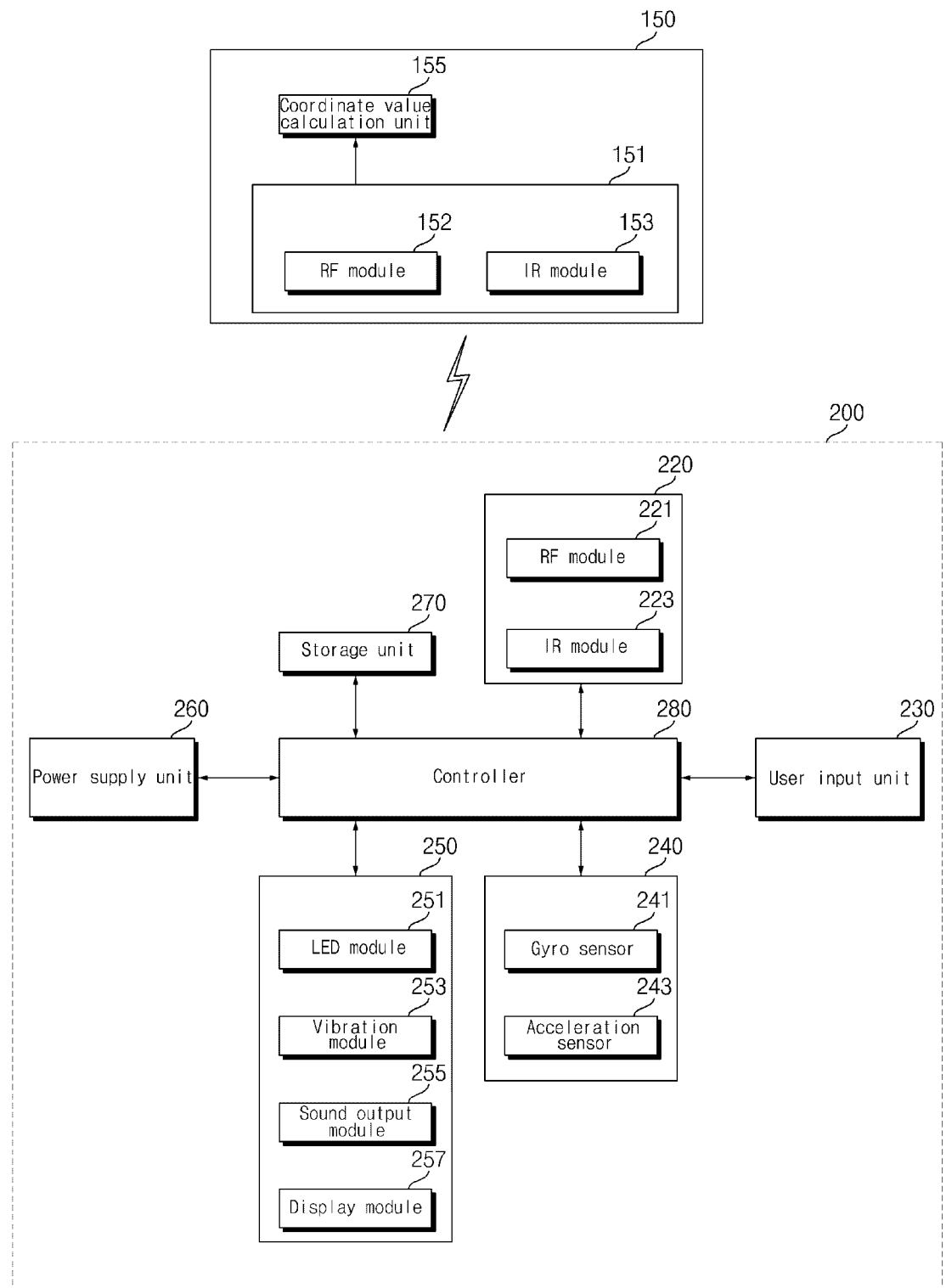
FIG. 3B is an example of an internal block diagram of the remote control device of FIG. 2.

FIG. 3A is a diagram illustrating a control method of a remote control device of FIG. 2, and FIG. 3B is an example of an internal block diagram of the remote control device of FIG. 2.

Referring to FIG. 3A, it can be seen that a pointer 205 corresponding to the remote control device 200 is displayed on the display 180 of the image display apparatus 100.

Referring to FIG. 3A(a), a user may move or rotate the remote control device 200 up-down, left-right, forward and backward. At this time, the pointer 205 displayed on the display 180 of the image display apparatus 100 may be displayed in response to the movement of the remote control device 200. Since a corresponding pointer 205 is moved and displayed according to movement in a 3D space, as shown in the drawing, such a remote control device 200 may be named as a space remote control or a 3D pointing device.

Referring to FIG. 3A(b), when a user moves the remote control device 200 to the left, it can be seen that the pointer 205 displayed on the display 180 of the image display apparatus 100 also moves to the left in response to the movement of the remote control device 200.

Information on the movement of the remote control device 200 detected through the sensor of the remote control device 200 may be transmitted to the image display apparatus 100. The image display apparatus 100 may calculate the coordinates of the pointer 205 from information on the movement of the remote control device 200. The image display apparatus 100 may display a pointer 205 corresponding to the calculated coordinates.

Referring to FIG. 3A(c), in a state of pressing a specific button provided in the remote control device 200, a user may move the remote control device 200 away from the display 180. Accordingly, a selection area in the display 180 corresponding to the pointer 205 may be zoomed-in and displayed enlarged. Conversely, in a state of pressing a specific button provided in the remote control device 200, when a user moves the remote control device 200 closer to the display 180, the selection area in the display 180 corresponding to the pointer 205 may be zoomed-out and displayed reduced.

Meanwhile, when the remote control device 200 moves away from the display 180, the selected area may be zoomed-out, and when the remote control device 200 moves closer to the display 180, the selected area may be zoomed-in.

Meanwhile, in a state in which a user presses a specific button in the remote control device 200, the recognition of vertical and horizontal movements may be excluded. That is, when the remote control device 200 moves away from or approaches the display 180, the up, down, left, and right movements are not recognized, and only forward and backward movements may be recognized. In a state in which the user does not press a specific button in the remote control device 200, only up, down, left, and right movements of the remote control device 200 can be recognized, and accordingly, only the pointer 205 can be moved.

Meanwhile, the moving speed or moving direction of the pointer 205 may correspond to the moving speed or moving direction of the remote control device 200.

Referring to FIG. 3B, the remote control device 200 may include a wireless communication unit 220, a user input unit 230, a sensor unit 240, an output unit 250, a power supply unit 260, a storage unit 270, and/or a controller 280.

The wireless communication unit 220 may transmit and receive signals to and from the image display apparatus 100.

In this embodiment, the remote control device 200 may include an RF module 221 capable of transmitting and receiving signals to and from the image display apparatus 100 according to radio frequency (RF) communication standards. In addition, the remote control device 200 may include an IR module 223 capable of transmitting and receiving signals to and from the image display apparatus 100 according to infrared radiation (IR) communication standards.

The remote control device 200 may transmit a signal including information on the movement of the remote control device 200 to the image display apparatus 100 through the RF module 221. The remote control device 200 may receive a signal transmitted by the image display apparatus 100 through the RF module 221.

The remote control device 200 may transmit commands related to power on/off, channel change, volume change, etc. to the image display apparatus 100 through the IR module 223.

The user input unit 230 may include a keypad, a button, a touch pad, a touch screen, and the like. A user may input a command related to the image display apparatus 100 to the remote control device 200 by operating the user input unit 230.

When the user input unit 230 includes a hard key button, a user may input a command related to the image display apparatus 100 to the remote control device 200 through a push operation of the hard key button.

If the user input unit 230 has a touch screen, a user may input a command related to the image display apparatus 100 to the remote control device 200 by touching a soft key on a touch screen.

Meanwhile, the user input unit 230 may include various types of input means that a user can operate, such as a scroll key or a jog key, and the present embodiment does not limit the scope of the present disclosure.

The sensor unit 240 may include a gyro sensor 241 or an acceleration sensor 243. The gyro sensor 241 may sense the movement of the remote control device 200.

The gyro sensor 241 may sense information on the operation of the remote control device 200 based on x, y, and z axes. The acceleration sensor 243 may sense information on the moving speed of the remote control device 200, and the like. Meanwhile, the sensor unit 240 may further include a distance measurement sensor capable of sensing a distance to the display 180.

The output unit 250 may output an image or voice signal corresponding to operation of the user input unit 230 or a signal transmitted from the image display apparatus 100. Through the output unit 250, a user can recognize whether the user input unit 230 is operated or whether the image display apparatus 100 is controlled.

The output unit 250 may include an LED module 251 including at least one light emitting device (e.g., Light Emitting Diode (LED)), a vibration module 253 that generates a vibration, a sound output module 255 that outputs sound, and/or a display module 257 that outputs an image.

The power supply unit 260 may supply power to each component provided in the remote control device 200. The power supply unit 260 may include at least one battery (not shown).

When the movement of the remote control device 200 is not detected for a certain time through the sensor unit 240, the power supply unit 260 may stop supplying power to each component provided in the remote control device 200, thereby preventing unnecessary power consumption.

When a certain event occurs, the power supply unit 260 may resume supplying power to each component provided in the remote control device 200. For example, the power supply unit 260 may resume power supply to each component, when a certain key provided in the remote control device 200 is operated. For example, when the movement of the remote control device 200 is detected through the sensor unit 240, the power supply unit 260 may resume supplying power to each component provided in the remote control device 200.

The storage unit 270 may store various types of programs, application data, and the like necessary for controlling or operating the remote control device 200.

When the remote control device 200 wirelessly transmits and receives signals through the image display apparatus 100 and the RF module 221, the remote control device 200 and the image display apparatus 100 may transmit and receive signals through a certain frequency band. The controller 280 of the remote control device 200 may store information related to a frequency band that can wirelessly transmit/receive signals with the image display apparatus 100 paired with the remote control device 200 in the storage unit 270 and be referenced.

The controller 280 may include at least one processor, and may control the overall operation of the remote control device 200 by using the processor included therein.

The controller 280 may transmit a control signal corresponding to a certain key operation of the user input unit 230 or a control signal corresponding to the movement of the remote control device 200 sensed by the sensor unit 240 to the image display apparatus 100 through the wireless communication unit 220.

The user input interface unit 150 of the image display apparatus 100 may include a wireless communication unit 151 capable of transmitting and receiving signals wirelessly with the remote control device 200, and a coordinate value calculation unit 155 capable of calculating coordinate values of a pointer corresponding to the operation of the remote control device 200.

The user input interface unit 150 may transmit and receive signals wirelessly with the remote control device 200 through a RF module 152. In addition, it may receive a signal transmitted by the remote control device 200 according to the IR communication standard through an IR module 153.

The coordinate value calculation unit 155 may calculate the coordinate value (x, y) of the pointer 205 to be displayed on the display 170 by correcting hand shake or error, from the signal corresponding to the operation of the remote control device 200 received through the wireless communication unit 151.

A transmission signal of the remote control device 200 input to the image display apparatus 100 through the user input interface unit 150 may be transmitted to the controller 180 of the image display apparatus 100. The controller 180 of the image display apparatus 100 may determine information related to the operation and key operation of the remote control device 200 from the signal transmitted from the remote control device 200, and correspondingly, may control the image display apparatus 100.

As another example, the remote control device 200 may calculate a pointer coordinate value corresponding to the operation, and output it to the user input interface unit 150 of the image display apparatus 100. In this case, the user input interface unit 150 of the image display apparatus 100 may transmit information on the received pointer coordinate value to the controller 180 without a separate process for hand shake or error correction.

In addition, as another example, unlike the drawing, the coordinate value calculation unit 155 may be provided inside the controller 170, not in the user input interface unit 150.

Figure 4A:
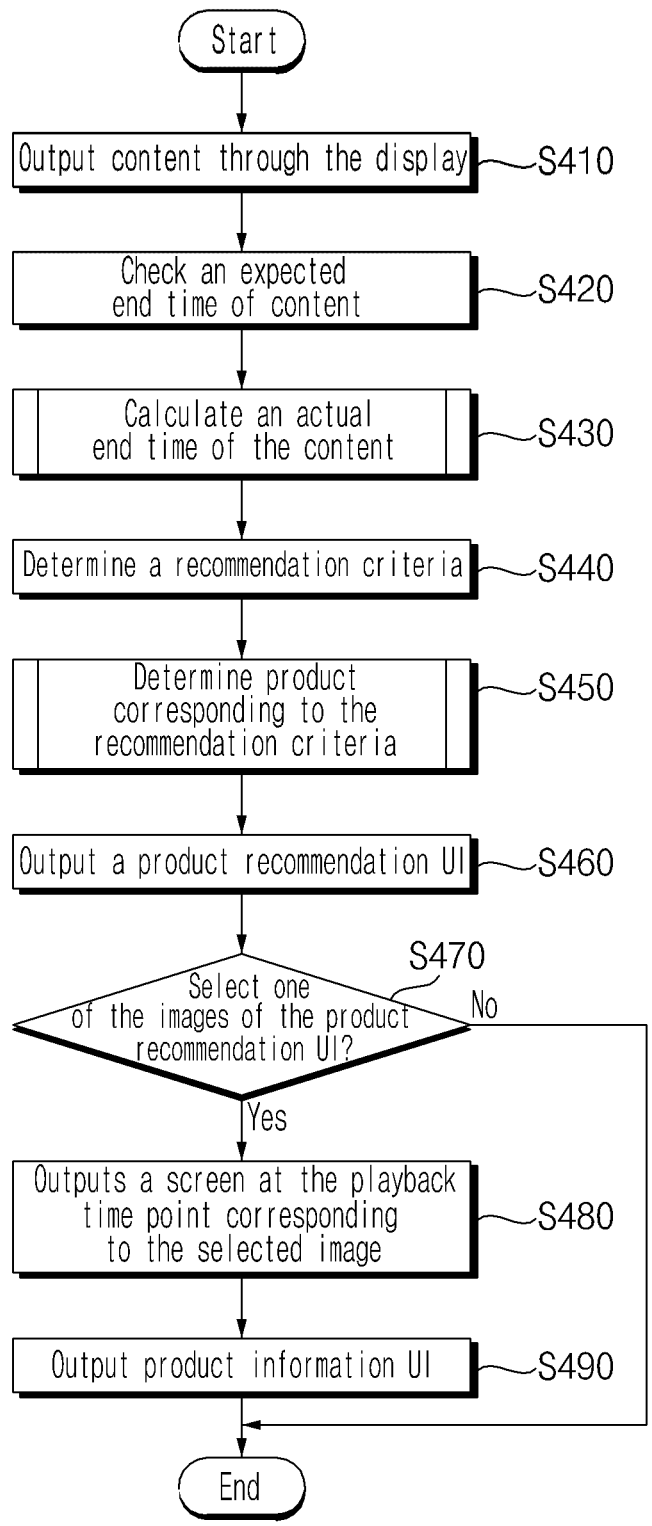
FIGS. 4A to 4C are flowcharts of a method of operating the image display apparatus according to an embodiment of the present disclosure.
Figure 4B:
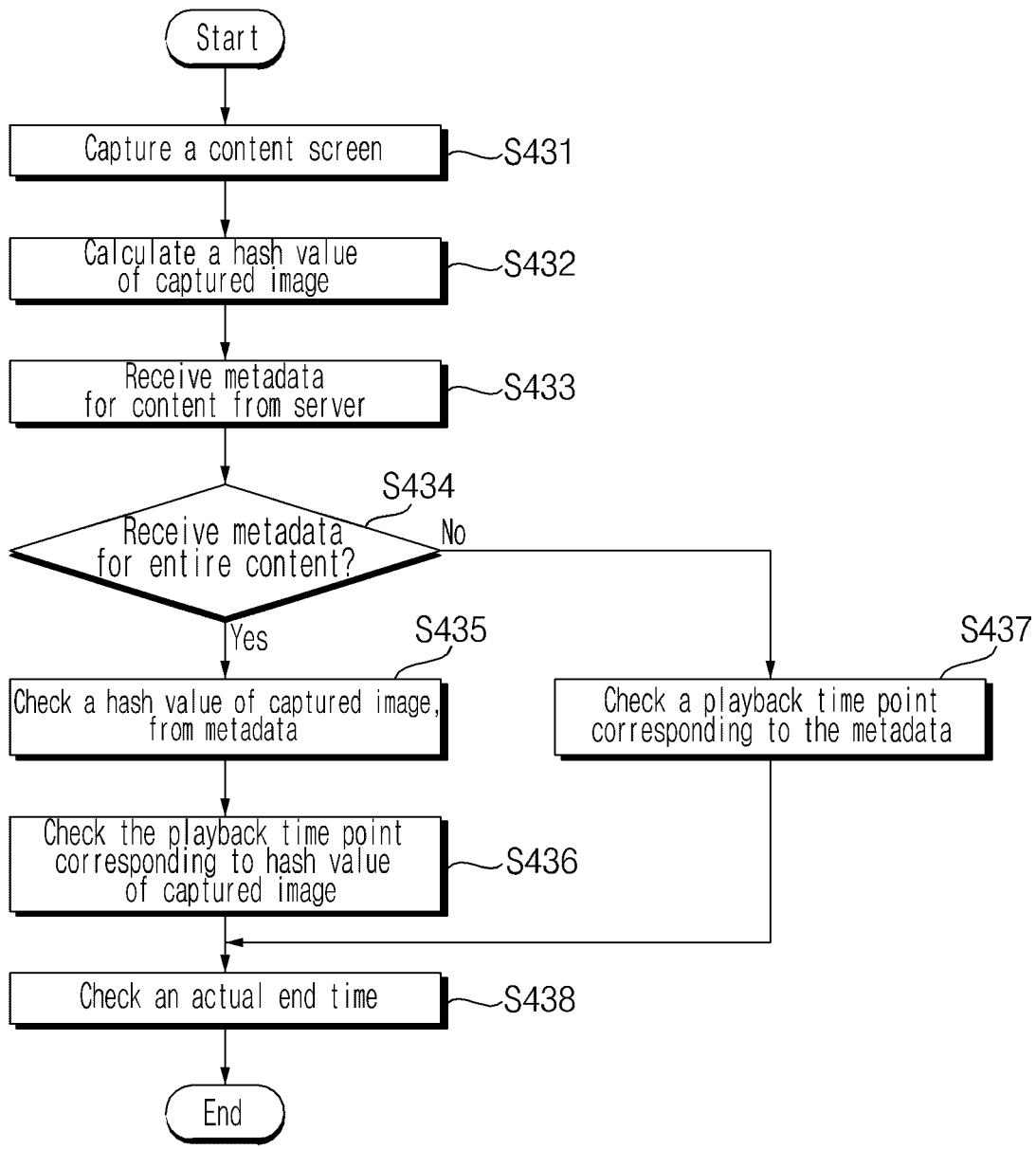
Figure 4C:
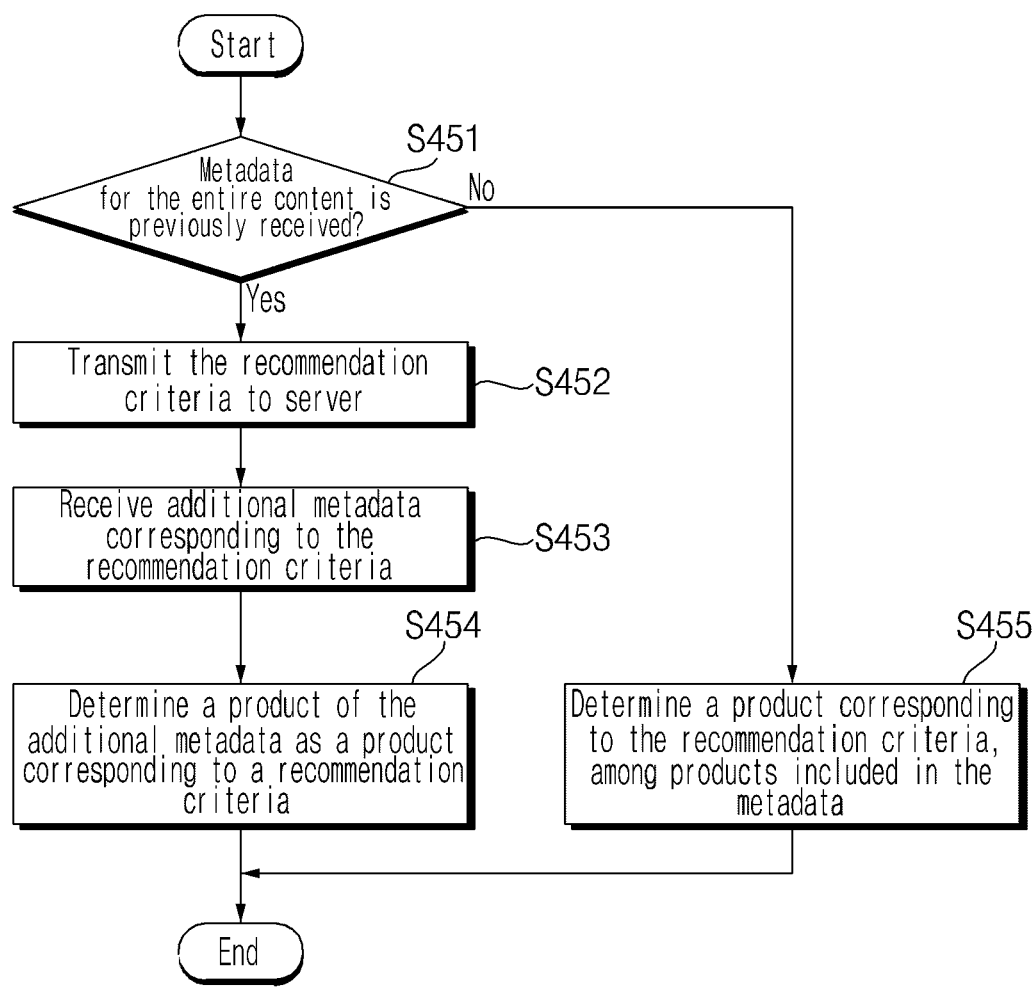

FIGS. 4A to 4C are flowcharts of a method of operating an image display apparatus according to an embodiment of the present disclosure, and FIGS. 5A to 8C are diagrams for explaining a method of operating the image display apparatus of FIGS. 4A to 4C.

Referring to FIG. 4A, the image display apparatus 100 may output content through the display 180, at operation S410. For example, the image display apparatus 100 may receive and process any one of a terrestrial broadcasting signal, a satellite broadcasting signal, a cable broadcasting signal, and an IPTV broadcasting signal, and output signal-processed broadcasting content.

At operation S420, the image display apparatus 100 may check an expected end time of content. For example, the image display apparatus 100 may check the expected end time of content, based on a timeline of an electronic program guide EPG.

At operation S430, the image display apparatus 100 may calculate an actual end time point of the content, at a time point prior to a preset time from the expected end time of content. Here, the preset time may be determined in consideration of an error that can occur between a time when content is actually output through the image display apparatus 100 and a time when content was previously scheduled to be output in the timeline of the electronic program guide EPG.

Referring to FIG. 4B, at operation S431, the image display apparatus 100 may capture a screen output through the display 180 at a time point prior to a preset time from the expected end time of content. Here, the operation of capturing a screen may mean an operation of obtaining data (hereinafter, frame data) for a frame of content output through a screen.

The image display apparatus 100 may calculate a hash value of an image corresponding to the captured screen by using a certain hash function, at operation S432. Here, the certain hash function may mean a function that maps data of an arbitrary length to data of a fixed length for the purpose of efficient data management, and the hash value of image may mean a result value obtained by inputting data corresponding to an image to a hash function.

The image display apparatus 100 may receive metadata for content from the first server 400 at operation S433. For example, the image display apparatus 100 may transmit an identifier and/or a hash value of content to the first server 400, and receive metadata corresponding to the identifier and/or the hash value of content from the first server 400.

Meanwhile, the first server 400 may be a server that stores various data for content. For example, the first server 400 may store a plurality of hash values mapped to each screen frame constituting the content and data for an object mapped to each hash value. Here, the data for an object may be data including various information related to an object included in a screen. For example, the data for an object mapped to the hash value may include the name and type (e.g. person, clothing, furniture) of each object included in a screen corresponding to the hash value, a thumbnail image corresponding to each object, Uniform Resource Locator (URL) of a web page corresponding to each object, and the like.

At operation S434, the image display apparatus 100 may check whether the metadata received from the first server 400 is a metadata for entire content. Here, the metadata for entire content may include a thumbnail image corresponding to each screen frame constituting content, a hash value mapped to each screen frame, a playback time point corresponding to each hash value, a data for an object mapped to each hash value, and the like. That is, the metadata for entire content may include data for all products related to content.

For example, when the image display apparatus 100 transmits an identifier of content to the first server 400, the image display apparatus 100 may receive metadata for entire content from the first server 400 and, when the image display apparatus 100 transmits the identifier and hash value of content to the first server 400, the image display apparatus 100 may receive metadata for a part of the content corresponding to the hash value from the first server 400.

At operation S435, when the metadata received from the first server 400 is a metadata for entire content, the image display apparatus 100 may check a hash value of an image corresponding to a captured screen, from the received metadata for the entire content.

The image display apparatus 100 may check the playback time point corresponding to the hash value of the image corresponding to the captured screen, at operation S436. For example, the image display apparatus 100 may check the hash value of the image corresponding to a captured screen, among hash values included in the metadata for entire content, and check the playback time point corresponding to a pertinent hash value.

Meanwhile, at operation S437, when the metadata received from the first server 400 is a metadata for a part of content, the image display apparatus 100 may check a playback time point corresponding to the received metadata for a part of content. For example, when the identifier and hash value of the content are received from the image display apparatus 100, the first server 400 may check the hash value received from the image display apparatus 100 among the hash values mapped to each screen frame constituting content, and transmit data for a playback time point corresponding to a pertinent hash value and an object mapped to hash value to the image display apparatus 100. At this time, the image display apparatus 100 may check the playback time point included in the received metadata for a part of content as a playback time point corresponding to a hash value of an image corresponding to the captured screen.

At operation S438, the image display apparatus 100 may calculate an actual end time point of the content, based on a playback time point corresponding to a hash value of an image corresponding to the captured screen.

For example, the image display apparatus 100 may calculate a remaining playback time point of the content by calculating a difference between a playback time point corresponding to the hash value of the image corresponding to the captured screen and an expected end time of the content, and may calculate a time point at which the remaining playback time point has elapsed from the actual time point at which the screen was captured as the actual end time point of the content. In this regard, it will be described with reference to FIGS. 5A to 5C.

Figure 5A:
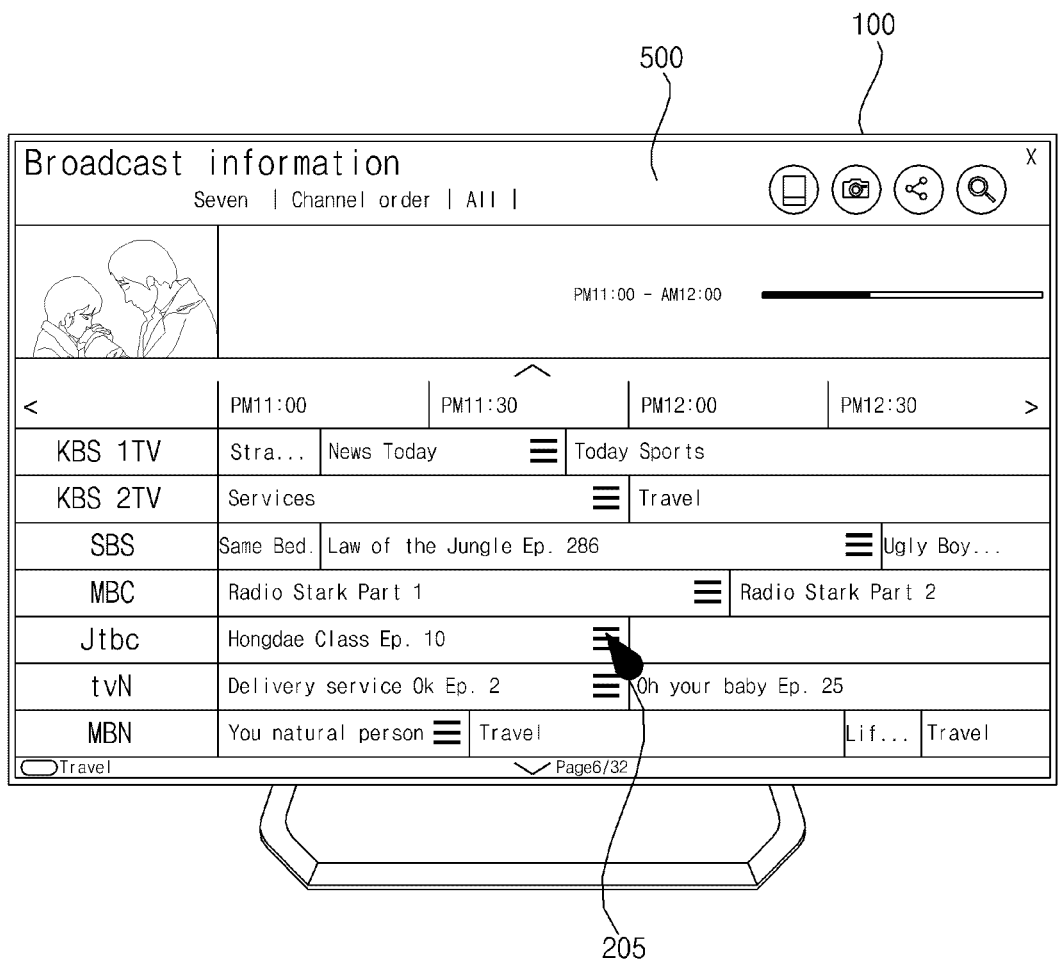
FIGS. 5A to 9C are diagrams for explaining a method of operating an image display apparatus.

Referring to FIG. 5A, the image display apparatus 100 may output an electronic program guide EPG screen 500, and a user may check the timeline for broadcasting content which is currently being broadcast or scheduled to be broadcast in each channel, through the electronic program guide EPG screen 500.

Figure 5B:
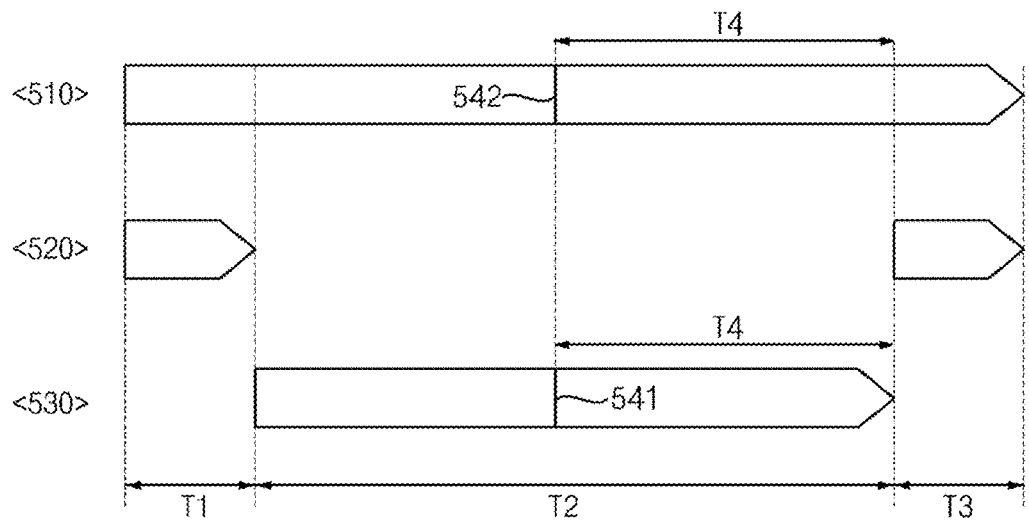
Figure 5B:
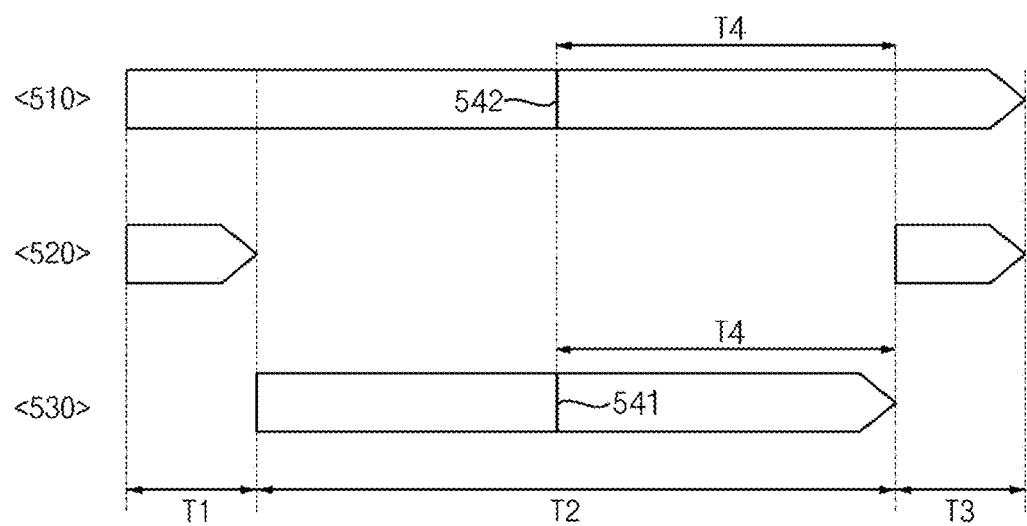
Figure 5C:
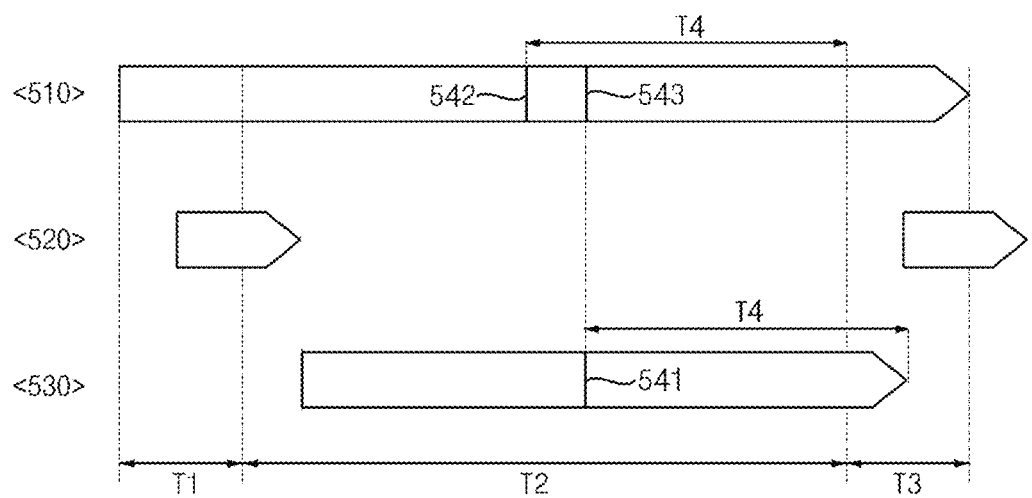

Meanwhile, referring to FIGS. 5B and 5C, a timeline 510 for specific content included in the electronic program guide EPG, and an actual timeline 520 in which advertisements are output through the image display apparatus 100 and an actual timeline 530 in which specific content is output may be compared.

The timeline 510 for specific content included in the electronic program guide EPG may include all of an advertisement output time T1, T3 and a specific content output time T2.

At this time, as shown in FIG. 5B, when the image display apparatus 100 accurately outputs advertisement and specific content according to the timeline of the electronic program guide EPG, it can be seen that no error occurs between a time point 541 when a specific screen is output from the image display apparatus 100 and a time point 542 when a specific screen is previously scheduled to be output.

In addition, since an error does not occur between the time point 541 when a specific screen is output from the image display apparatus 100 and the time point 542 when a specific screen is previously scheduled to be output, based on the remaining playback time point T4 of the content, it can be seen that the expected end time of the content coincides with the actual end time point of the content.

On the other hand, as shown in FIG. 5C, when an error occurs between an actual start time when advertisements are output through the image display apparatus 100 and a start time previously scheduled in the timeline of the electronic program guide EPG, it can be seen that an error occurs between the time point 541 when a specific screen is output from the image display apparatus 100 and the time point 542 when a specific screen is previously scheduled to be output, and it can be seen that the time point 541 when a specific screen is output from the image display apparatus 100 corresponds to the time point 543 when a completely different screen is scheduled to be output in the timeline of the electronic program guide EPG.

In addition, as an error occurs between the time point 541 when a specific screen is output from the image display apparatus 100 and the time point 542 when a specific screen is previously scheduled to be output, it can be seen that an error also occurs between the expected end time of the content and the actual end time point of the content.

That is, according to various embodiments of the present disclosure, even if an error occurs between the time when the image display apparatus 100 outputs a specific screen and the time when a specific screen is scheduled to be output in the timeline of the electronic program guide EPG, based on the hash value of an image corresponding to the screen that the image display apparatus 100 is actually outputting, an actual end point of content can be accurately calculated.

Referring back to FIG. 4A, the image display apparatus 100 may determine a recommendation criteria, based on the database stored in the storage unit 140, at operation S440.

For example, when a UI recommending a product related to content is output through the display 180 of the image display apparatus 100, and a user checks, selects, or shares information related to a product through a corresponding UI, or purchases a product, the image display apparatus 100 may add information related to a corresponding product, for example, data on a title, genre, date of a content in which a product is exposed, a product type, a detailed information, a manufacturer, and a person who used or wore a product in the content, etc. to a database for a use history stored in the storage unit 140.

At this time, based on the database for use history generated as described above, the image display apparatus 100 may determine a recommendation criteria related to the content.

For example, when specific content is output through the display 180 of the image display apparatus 100, the image display apparatus 100 may determine at least one product related to the title and/or genre of specific content, among products included in the database for use history, and may determine the type, detailed information, manufacturer, related person, etc. of the determined product as recommendation criteria.

The image display apparatus 100 may determine at least one product related to the content corresponding to the recommendation criteria, at operation S450. Referring to FIG. 4C, the image display apparatus 100 may check whether metadata for the entire content is previously received, at operation S451.

At operations S452 and S453, when metadata for the entire content is not previously received, for example, when metadata for only a part of the content is received at operation S433, the image display apparatus 100 may transmit the recommendation criteria to the first server 400, and may receive metadata (hereinafter, additional metadata) corresponding to the recommendation criteria from the first server 400.

For example, when a recommendation criteria is received from the image display apparatus 100, the first server 400 may check the product type, detailed information, manufacturer, related person, and the like included in the recommendation criteria, check whether data for an object corresponding to the recommendation criteria exists, and check at least one hash value to which data for an object corresponding to the recommendation criteria is mapped.

In addition, the first server 400 may transmit an additional metadata including data for an object corresponding to the recommendation criteria, a hash value to which the data for an object corresponding to the recommendation criteria is mapped, a playback time point corresponding to each hash value, a thumbnail image corresponding to a screen frame mapped to each hash value, etc. to the image display apparatus 100.

At operation S454, when additional metadata is received from the first server 400, the image display apparatus 100 may determine a product included in data on an object included in the additional metadata as a product related to content corresponding to a recommendation criteria.

Meanwhile, at operation S455, when metadata for the entire content is previously received, the image display apparatus 100 may determine a product related to the content corresponding to the recommendation criteria, among products included in the metadata for the entire content. For example, the image display apparatus 100 may check at least one data on an object corresponding to the recommendation criteria, among data on an object included in metadata for the entire content, and may determine a product included in data for an identified object as a product related to content corresponding to the recommendation criteria.

Meanwhile, the image display apparatus 100 may store the metadata for the entire content received from the first server 400 and/or the additional metadata, in the storage unit 140. The image display apparatus 100 may store, in the storage unit 140, data on a product related to content corresponding to the recommendation criteria.

Referring back to FIG. 4A, at an actual end time point of the content, the image display apparatus 100 may output a UI that recommends at least one product related to the content through the display 180, at operation S460. For example, at the actual end time point of content, the image display apparatus 100 may output a UI (hereinafter, a product recommendation UI) that includes an image corresponding to a playback time point to which a product related to the content corresponding to the recommendation criteria is mapped and/or an image of a product related to content corresponding to the recommendation criteria, through the display 180. In this case, an image included in the product recommendation UI may correspond to a thumbnail image included in the metadata for the entire content and/or the additional metadata.

The image display apparatus 100 may check whether a user input for selecting any one of the images included in the product recommendation UI is received, at operation S470.

At operation S480, when a user input for selecting any one of the images included in the product recommendation UI is received, the image display apparatus 100 outputs a screen at the playback time point corresponding to the selected image, through the display 180.

For example, when content is stored in an external storage medium while content is being output through the display 180, the image display apparatus 100 may obtain frame data at a playback time point corresponding to the selected image from the external storage medium, and based on the obtained frame data, may output a screen at a playback time point corresponding to the selected image.

For example, the image display apparatus 100 may transmit an identifier of content and a data for the playback time point corresponding to the selected image to the second server 500, request the second server 500 to transmit frame data at a playback time point corresponding to the selected image, and based on the frame data received from the second server 500, may output a screen at a playback time point corresponding to the selected image.

Here, the second server 500 may be a Content Provider (CP) server that stores various contents and provides the stored contents.

The image display apparatus 100 may output, through the display 180, a UI (hereinafter, product information UI) including information related to at least one product mapped to a playback time point corresponding to the selected image, at operation S490. In this regard, it will be described in detail with reference to FIGS. 6A to 7B.

Figure 6A:
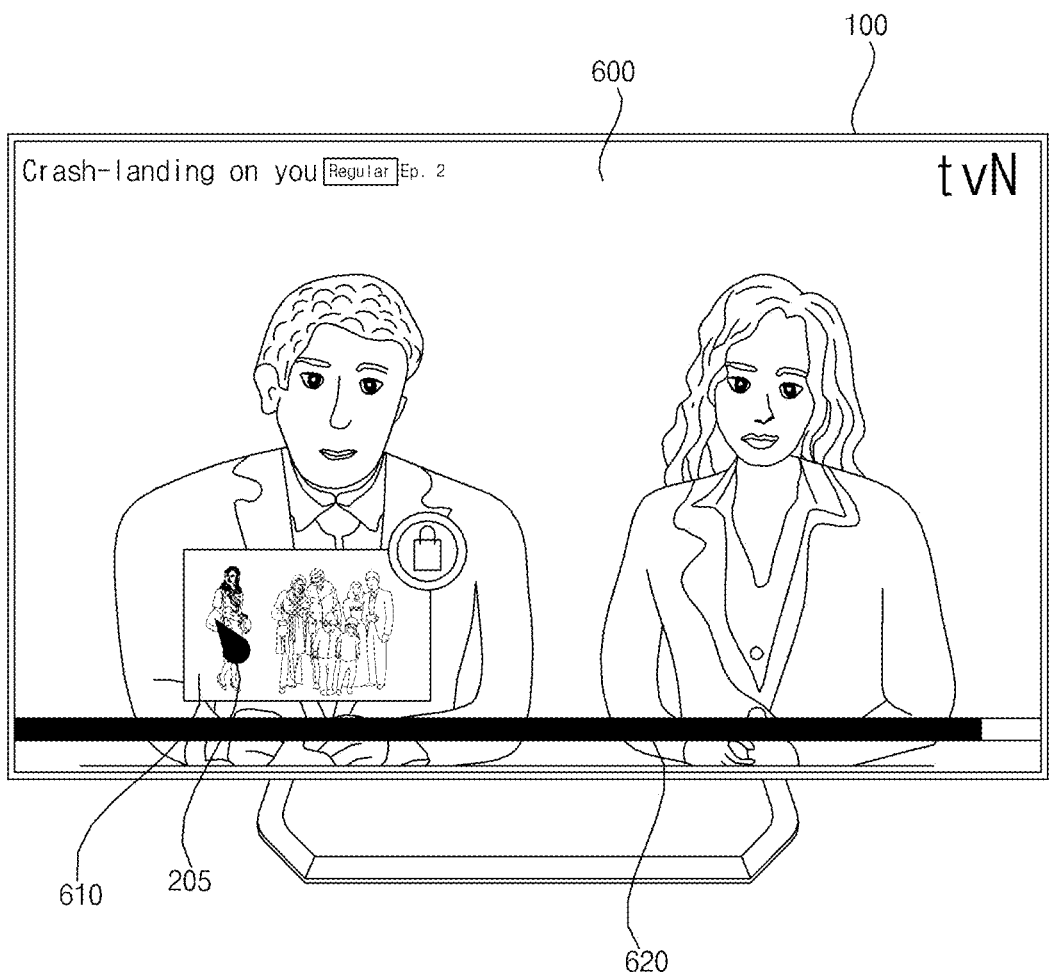
Figure 6B:
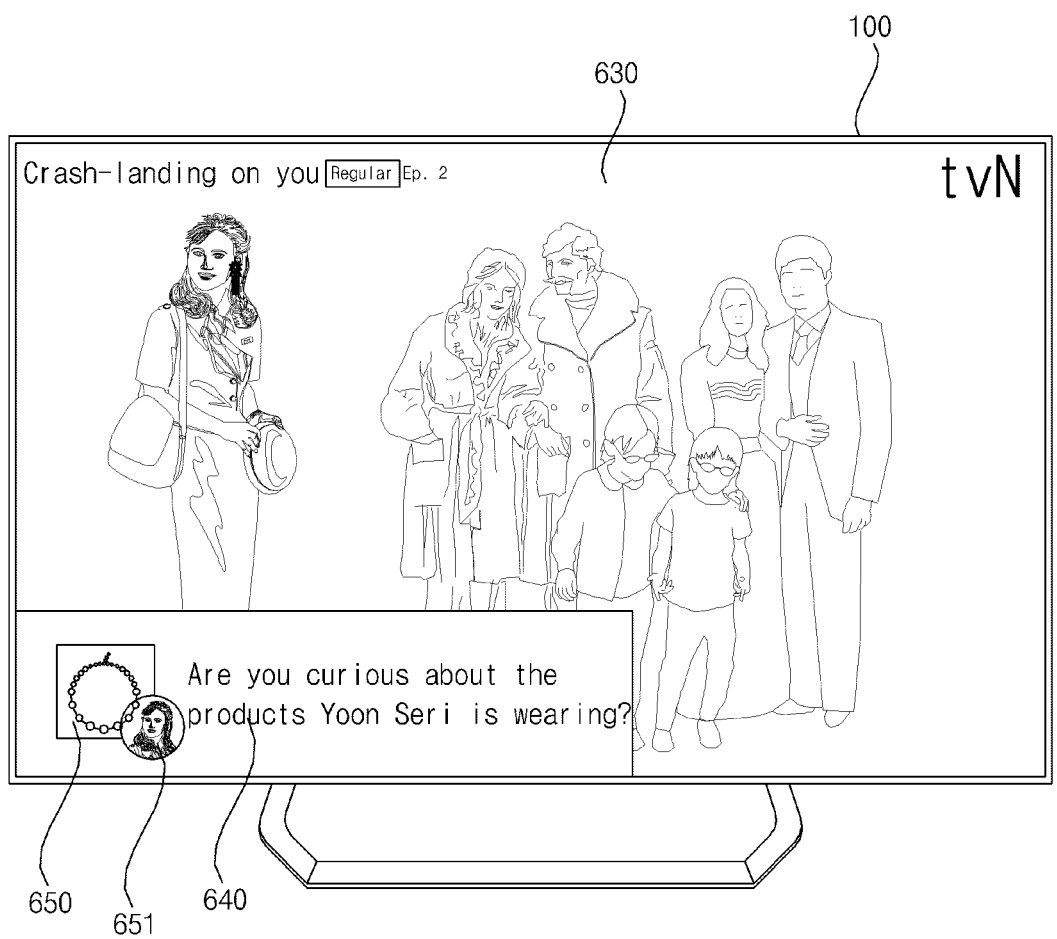

Referring to FIGS. 6A and 6B, in a state where a screen 600 corresponding to the end time of the content is output through the display 180, the image display apparatus 100 may output, through the display 180, a product recommendation UI including an image 610 corresponding to a playback time point to which a product related to content is mapped. In this case, the product recommendation UI may further include a playback bar 620 related to selection of playback time point of the content.

Meanwhile, when a user selects the image 610 included in the product recommendation UI by using the pointer 205 corresponding to the remote control device 200, the image display apparatus 100 may obtain frame data corresponding to the selected image 610, and may output a screen 630 (hereinafter, a recommendation time point screen) at a playback time point corresponding to the selected image 610, through the display 180.

In addition, the image display apparatus 100 may output the product information UI 640 related to the recommendation time point screen 630 together, while the recommendation time point screen 630 is output through the display 180. In this case, the product information UI 640 may include information 650, 651 on at least one product mapped to a playback time point when the recommendation time point screen 630 is displayed. For example, the product information UI 640 may include a thumbnail image 650 of a product related to content and a thumbnail image 651 of a person related to a corresponding product.

Meanwhile, when a user selects one of the thumbnail images 650 and 651 included in the product information UI 640, based on the URL of a web page linked to the selected thumbnail image, a web page screen where a corresponding product can be purchased may be output.

Figure 6C:
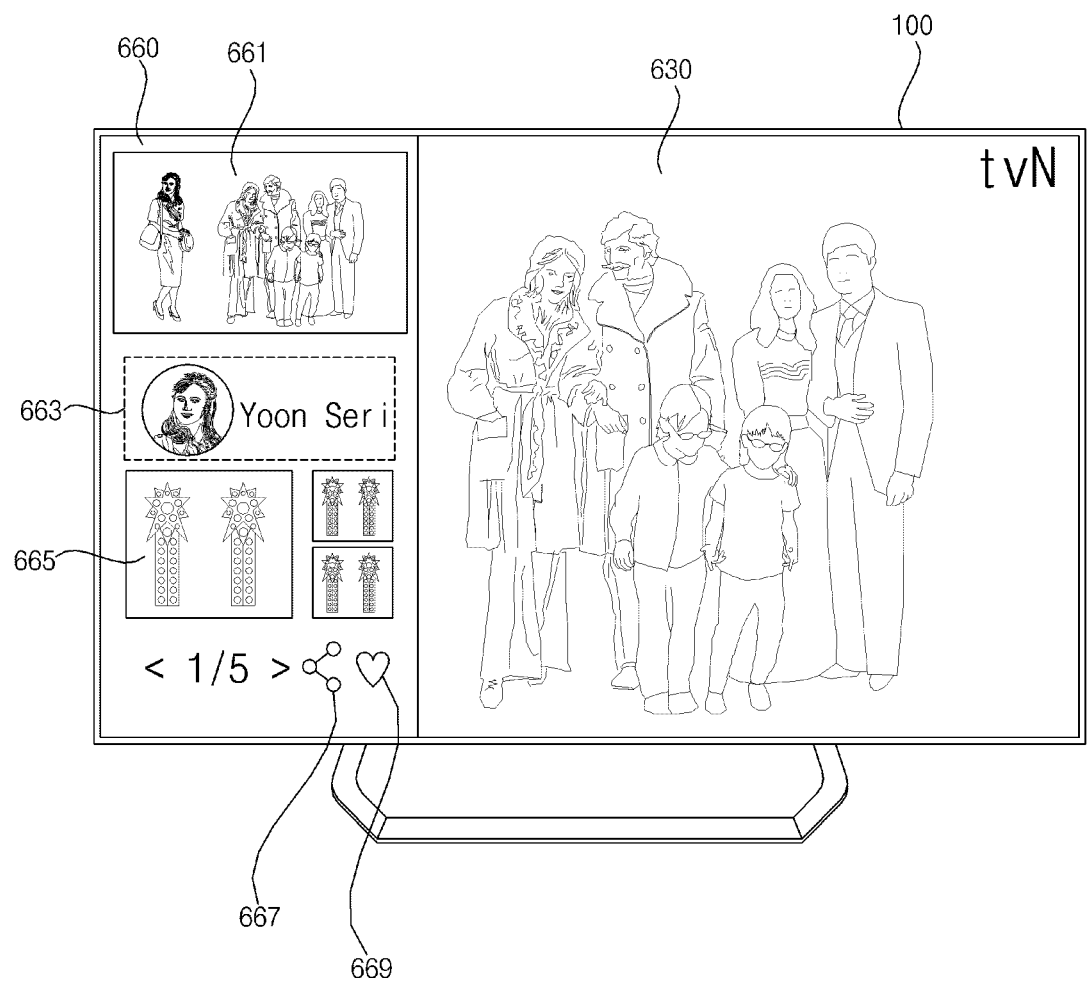

Meanwhile, referring to FIG. 6C, the image display apparatus 100 may output a product information UI 660 having a different form including information (661 to 669) related to at least one product mapped to the playback time point at which the recommendation time point screen 630 is output.

For example, the product information UI 660 may include a thumbnail image 661 corresponding to the recommendation time point screen 630, a thumbnail image 663 of a person related to a corresponding product, and a thumbnail image of a product related to content. 665, and may also include an item 667, 669 for sharing product information or setting a user's preference.

Figure 7A:
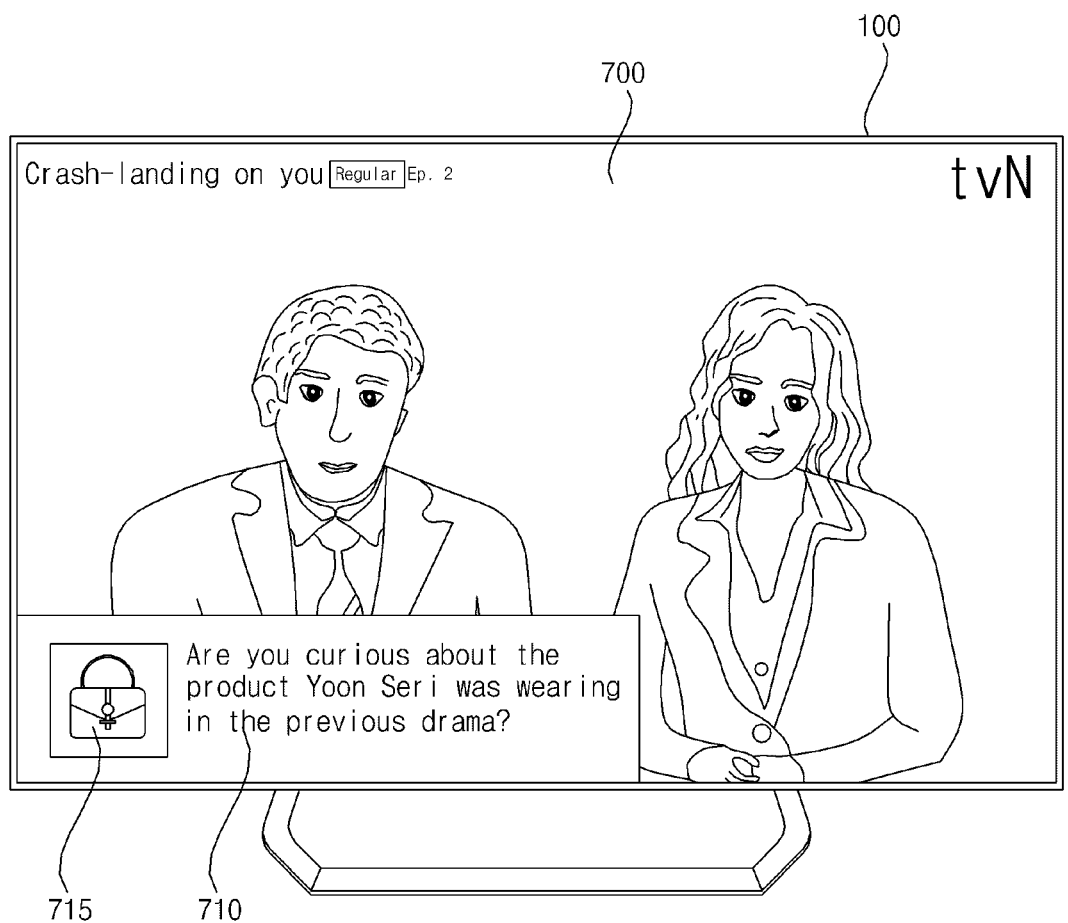
Figure 7B:
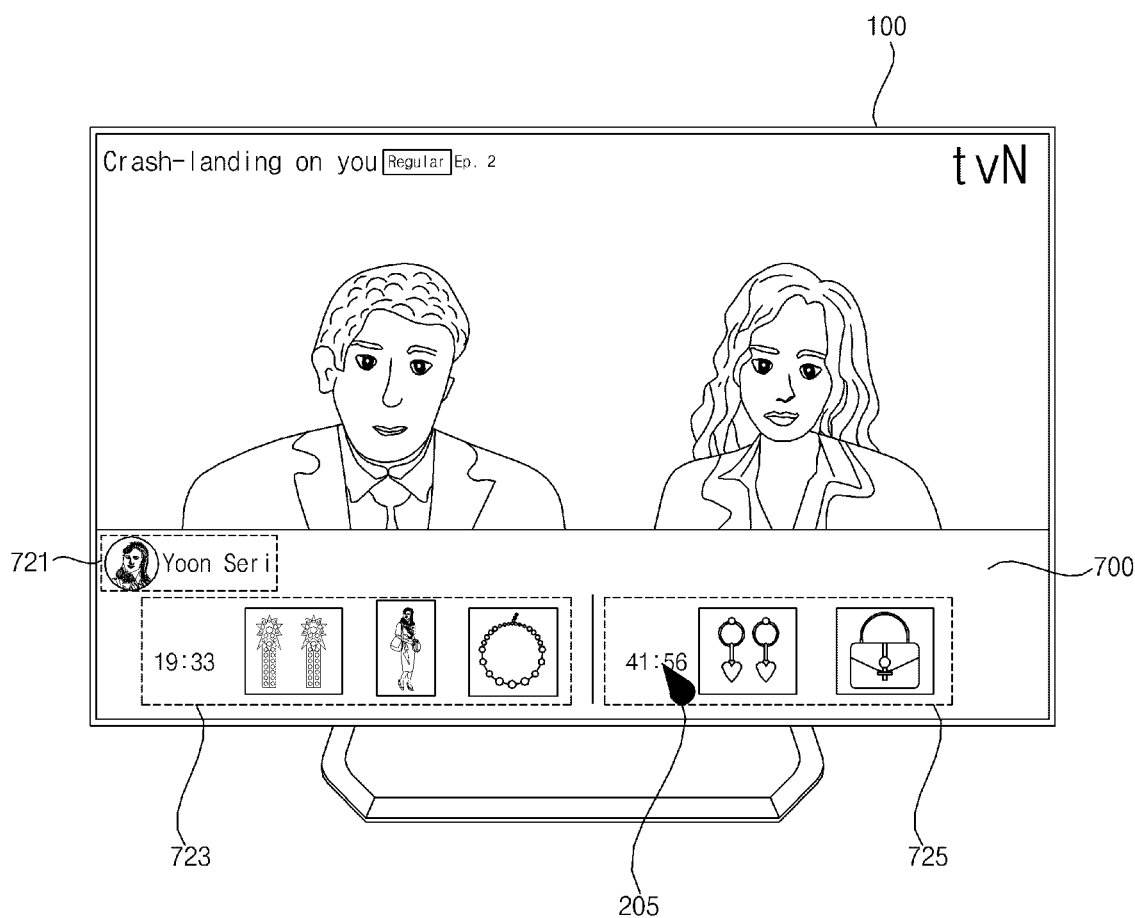
Figure 7C:
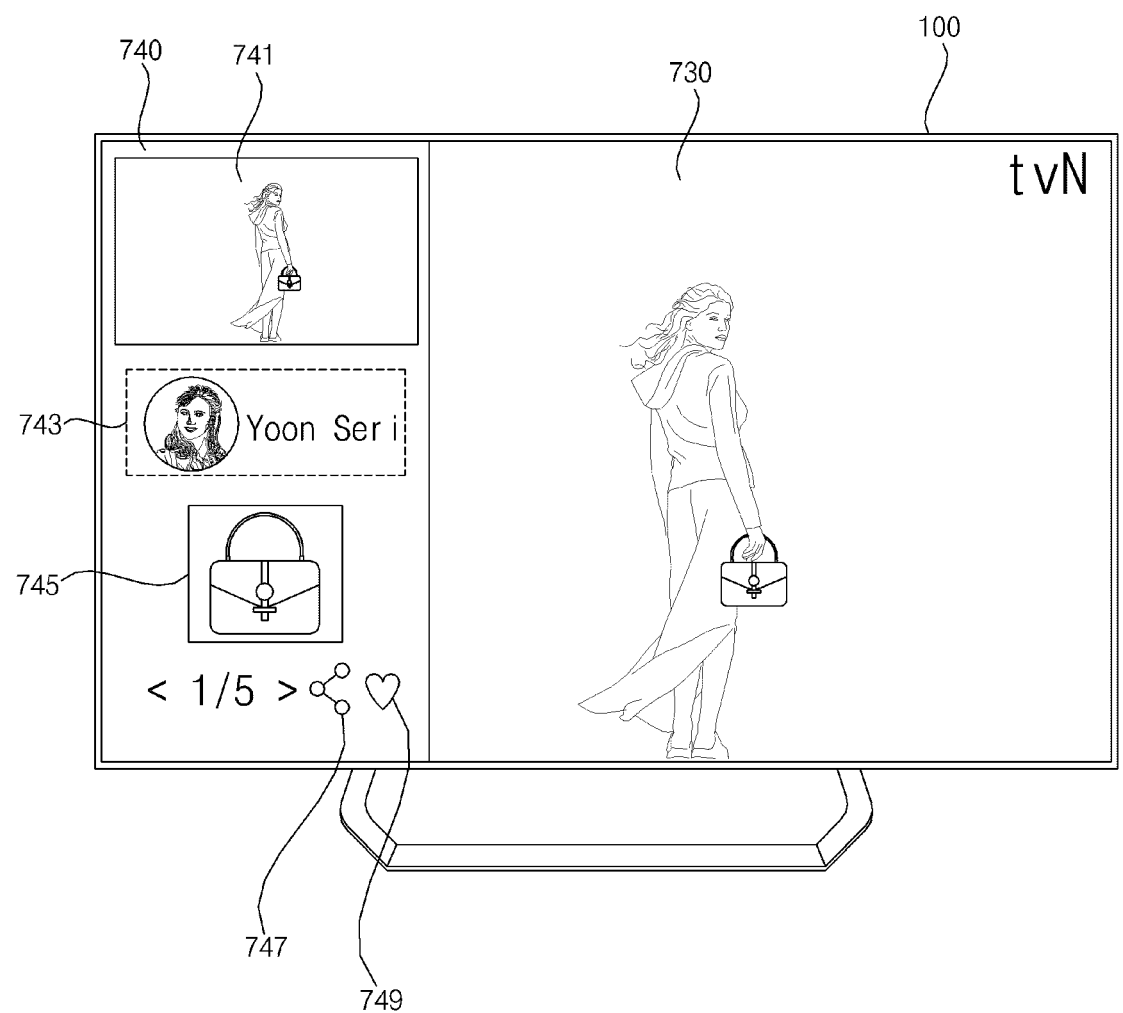

Meanwhile, referring to FIGS. 7A and 7B, in a state where a screen 700 corresponding to the end time of the content is output through the display 180, the image display apparatus 100 may output, through the display 180, a product recommendation UI 710 including only a thumbnail image 715 of a product related to content, or may output, through the display 180, a product recommendation UI 720 including all of a thumbnail image 721 of a person related to a product, a thumbnail image for a product related to content, and information 723, 725 related to the playback time point to which a corresponding product is mapped.

At this time, when a user uses the pointer 205 corresponding to the remote control device 200 to select any one of the information 723 and 725 related to the playback time point to which a product related to the content is mapped, the image display apparatus 100 may obtain frame data at the selected playback time point, and output a screen at the selected playback time point.

Meanwhile, regarding the update of the database for use history, it will be additionally described with reference to FIGS. 8A to 8C.

Figure 8A:
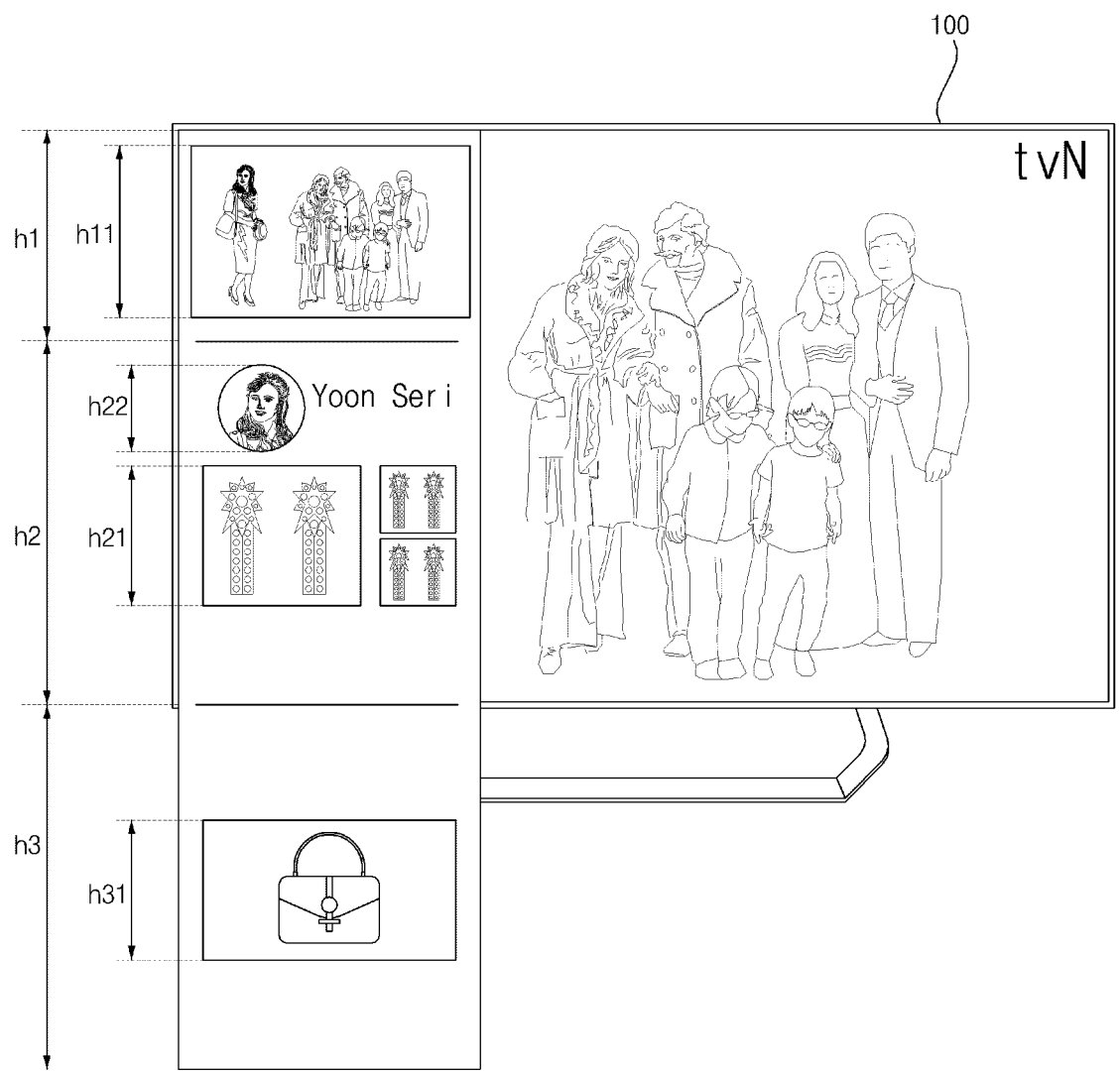
Figure 8B:
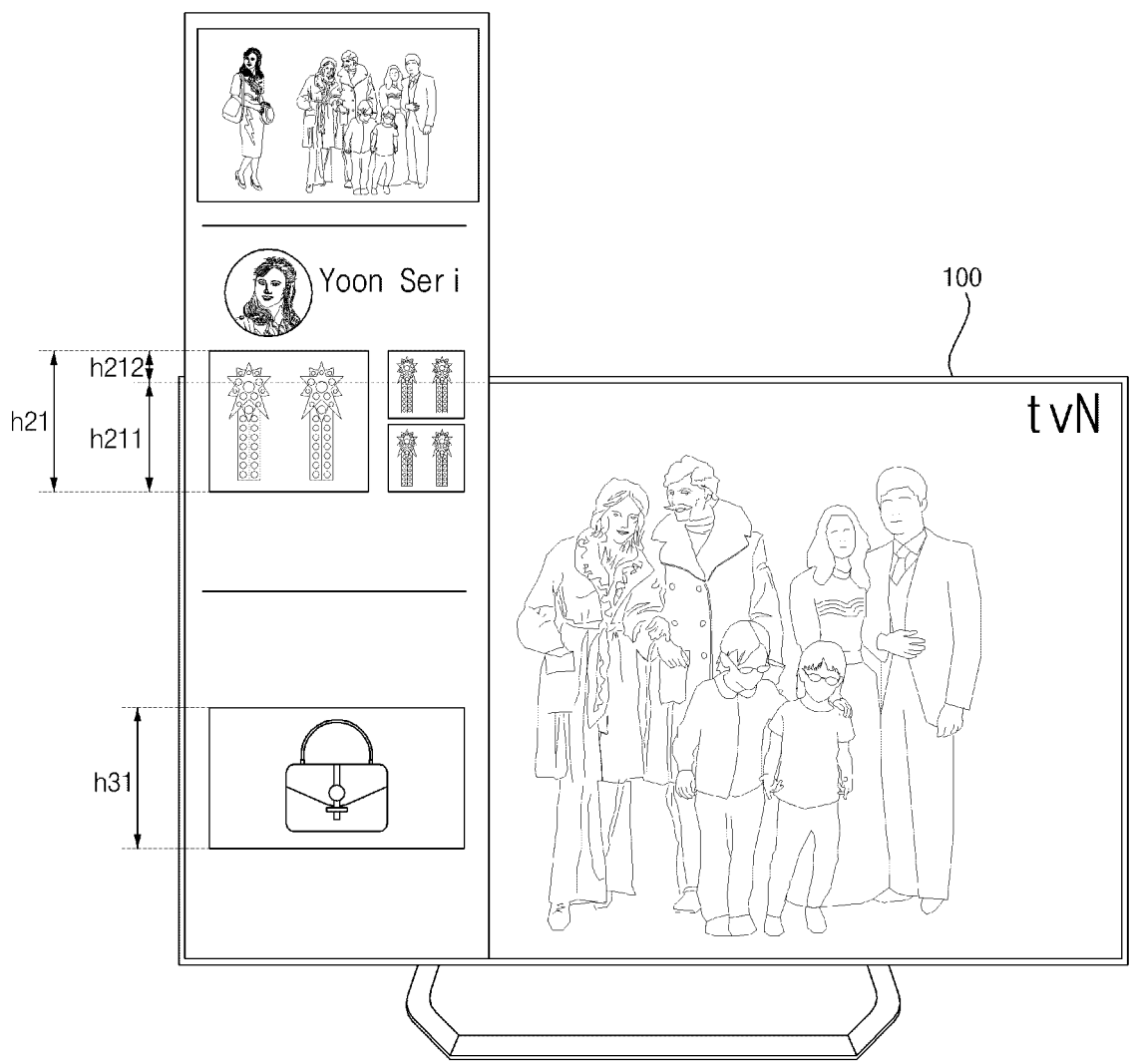
Figure 8C:
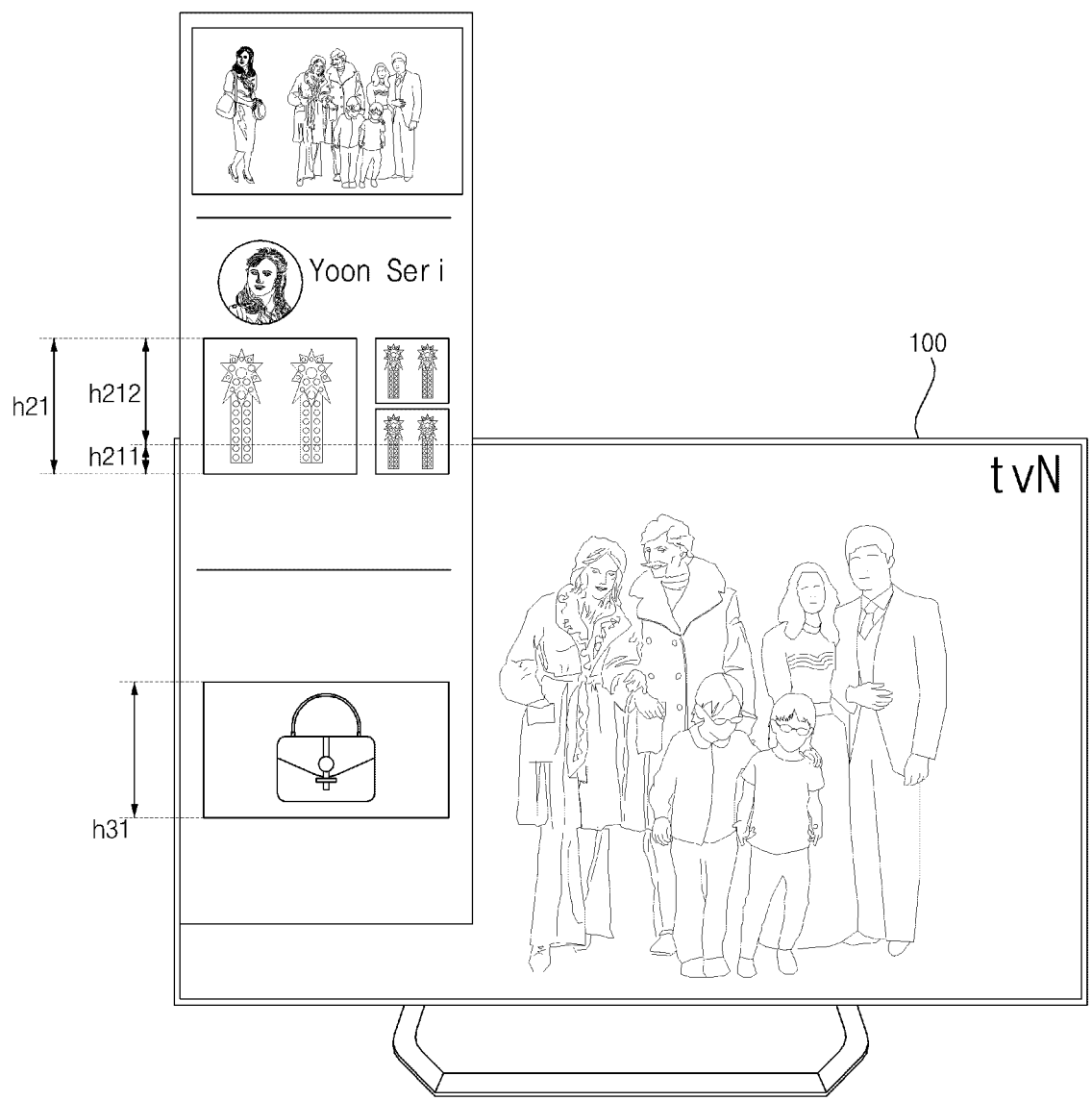

Referring to FIGS. 8A to 8C, the image display apparatus 100 may output, through the display 180a, a product information UI 820 recommending a product related to content, in a state in which a recommendation time point screen 810 is output.

In addition, the product information UI 820 may include a thumbnail image 821 corresponding to the recommendation time point screen 810, an area 822 displaying information on a first product, and an area 823 displaying information on a second product.

For example, in the case of FIG. 8A, it can be seen that only the thumbnail image 821 corresponding to the recommendation time point screen 810 and the area 822 in which information on the first product is displayed are output through the display 180 of the image display apparatus 100, and the area 823 in which information on the second product is displayed is not output through the display 180.

Meanwhile, when information on a specific product, for example, a thumbnail image for a specific product is output according to preset criteria, data including the type of specific product corresponding to a pertinent thumbnail image, detailed information, manufacturer, related person, etc. may be added to a database for use history.

For example, as shown in FIGS. 8A and 8B, when a half or more of a vertical length h21 of the entire thumbnail image of the first product is output through the screen area of the display 180 for a certain time (e.g. 5 seconds) or more, the image display device 100 may add data including accessories as a type of the first product, earrings as a detailed information, and Se-ri Yoon as a related person, to the database for use history.

In addition, referring to FIGS. 8B and 8C, when a state in which the entire thumbnail image of the second product is included in the screen area continues for a certain time (e.g. 5 seconds) or more, the image display apparatus 100 may add data including a bag as a type of the second product, a handbag as a detailed information, and Yoon Se-ri as a related person, to the database for use history.

Meanwhile, as shown in FIG. 8C, when a half or more of the vertical length h21 of the entire thumbnail image of the first product is not output through the screen area of the display 180 for a certain time (e.g. 5 seconds) or more, and according to a user's scroll input for the screen, the vertical length h211 of an area output through the screen area among the thumbnail image for the first product remains shorter than the vertical length h212 of the area not output through the screen area, data for the first product may not be added to the database for use history.

Figure 9A:
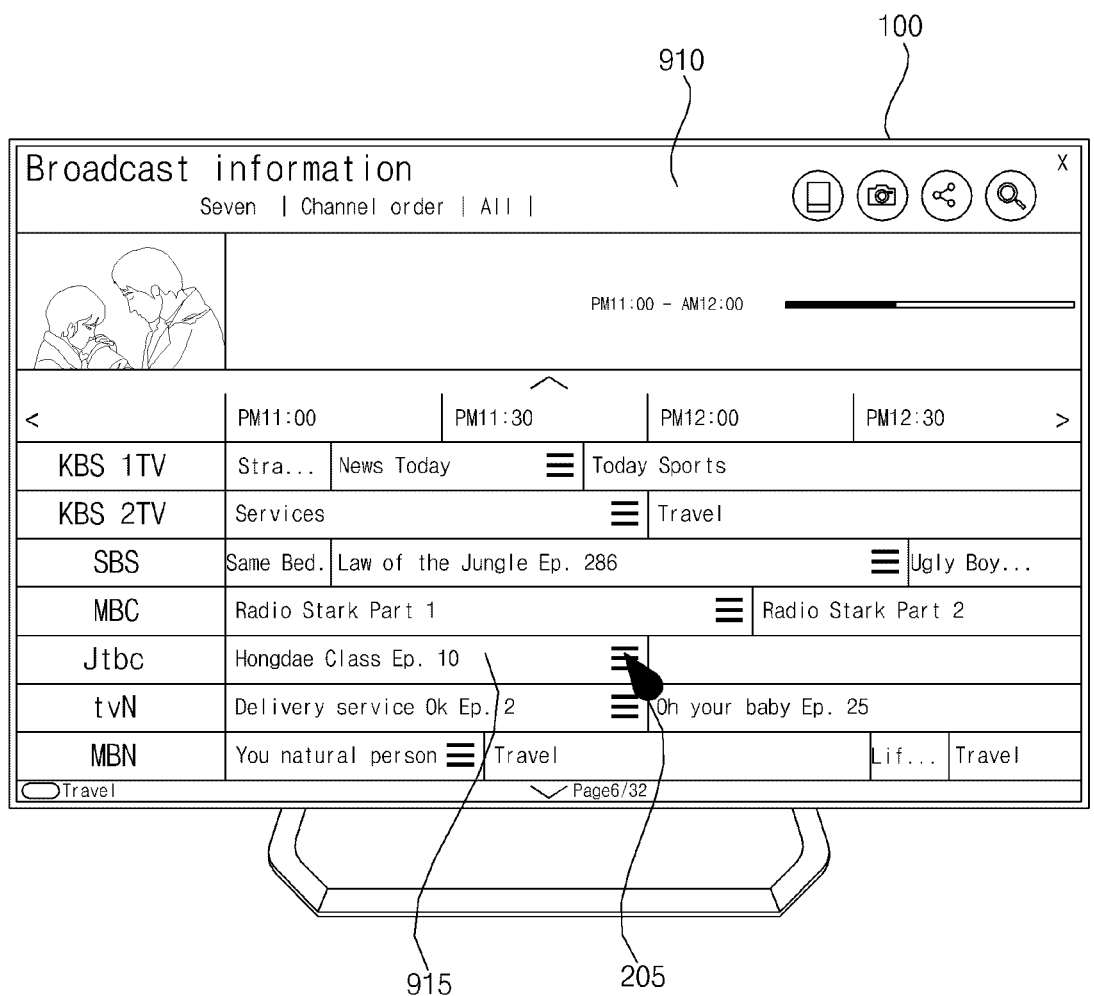

Meanwhile, referring to FIG. 9A, in a state where an electronic program guide EPG screen 910 is output through the display 180 of the image display apparatus 100, a user may select an item 915 corresponding to specific content by using the pointer 205 corresponding to the remote control device 200 in order to check information on specific content.

Figure 9B:
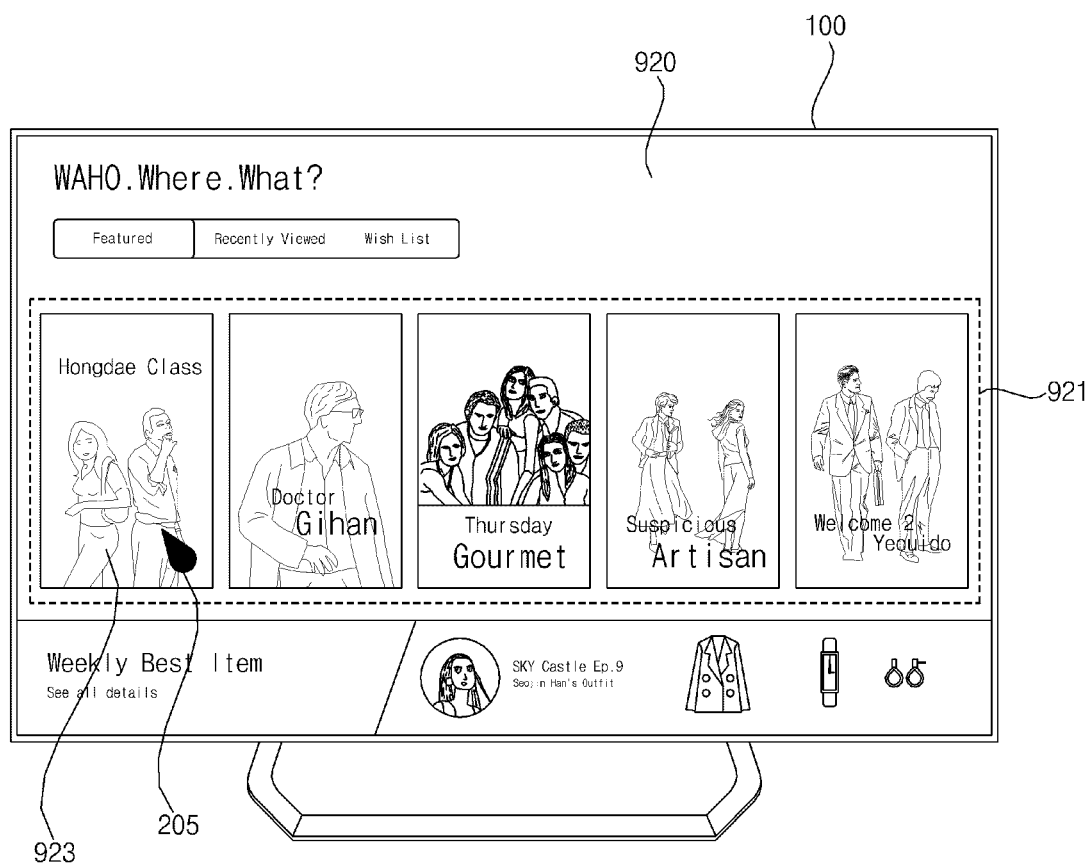

In addition, referring to FIG. 9B, the image display apparatus 100 may output a screen 920 for recommending content to a user through the display 180, and a user may select an item 923 corresponding to a specific content from among a plurality of recommended contents 921, by using the pointer 205 corresponding to the remote control device 200 in order to check information on the specific content.

Figure 9C:
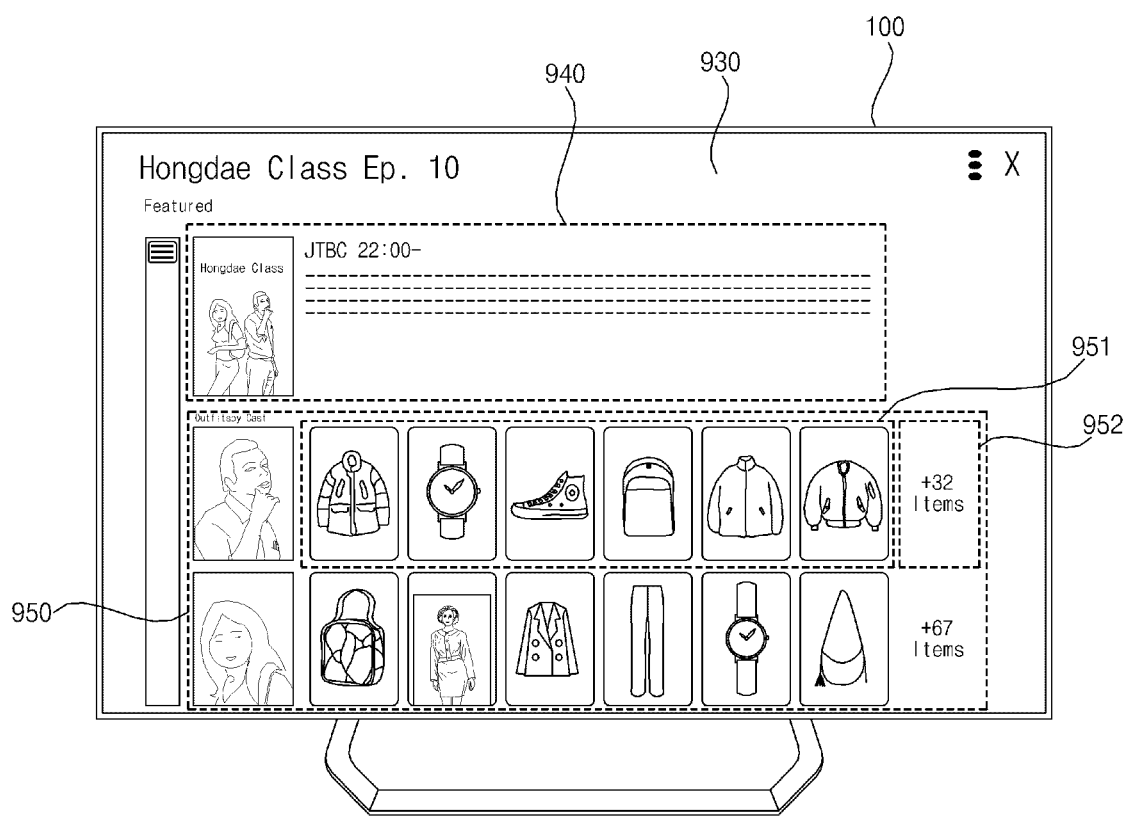

Referring to FIG. 9C, when the item 915 corresponding to specific content is selected from the electronic program guide EPG screen 910, or when the item 923 corresponding to specific content is selected from the screen 920 for recommending content, the image display apparatus 100 may output a screen 930 (hereinafter, a specific content information screen) providing information on specific content corresponding to the selected item 915, 923 through the display 180. At this time, when specific content is selected from the electronic program guide EPG screen 910 or the screen 920 for recommending content, the image display apparatus 100 may check whether metadata for the selected specific content and/or data for a product corresponding to the recommendation criteria related to specific content are/is stored in the storage unit 140.

Basic information 940 for specific content may be included in an area of the specific content information screen 930. Here, the basic information 940 for specific content may include a production company, a production team, cast members, a broadcasting period, a broadcasting time slot, audience rating, episode information, and the like.

Meanwhile, another area of the specific content information screen 930 may further include information 950 on a product related to specific content. For example, when a user watches a specific content through the image display apparatus 100 to receive metadata for the specific content from the first server 400, and a product related to content corresponding to the recommendation criteria is determined, the image display apparatus 100 may output a specific content information screen 930 including information 950 on a product related to specific content.

The information 950 on a product related to specific content may include information 951 on a product related to content corresponding to the recommendation criteria. For example, the image display apparatus 100 may allow an image of a product related to content corresponding to the recommendation criteria to be included in the specific content information screen 930, based on the metadata for entire contents stored in the storage unit 140, the additional metadata, and/or the data for a product related to content corresponding to the recommendation criteria.

At this time, when a user selects one of the images of a product related to the content corresponding to the recommendation criteria, a web page screen where a corresponding product can be purchased may be displayed, based on the URL of web page linked to the selected image.

Meanwhile, the specific content information screen 930 may include an image of a product related to content corresponding to a preset number of recommendation criteria. At this time, when a user selects an item 952, which is included in the specific content information screen 930, corresponding to an additional product related to specific content, the image display apparatus 100 may output not only information 951 on a product related to content corresponding to the recommendation criteria, but also information on other product related to specific content. As described above, according to various embodiments of the present invention, even if an error occurs between a time point when the content is actually output and a time point that was previously scheduled in the timeline of the electronic program guide EPG, the image display apparatus 100 may obtain frame data for a screen output through the display 180 before a certain time from an expected end time, and accurately calculate the actual end time point of the content, based on the frame data, thereby providing information to a user through the UI at an exact end time.

In addition, according to various embodiments of the present disclosure, a content-related recommendation criteria is generated based on a user's use history for the image display apparatus 100, thereby accurately providing information considering a user's preference at the actual end time point of the content.

Since the accompanying drawings are merely for easily understanding embodiments disclosed herein, it should be understood that the technical spirit disclosed herein is not limited by the accompanying drawings, and all changes, equivalents or substitutions are included in the spirit and technical scope of the present disclosure.

Meanwhile, an operation method of an image display apparatus of the present disclosure can also be embodied as a processor readable code on a recording medium readable by a processor provided in the image display apparatus. The processor-readable recording medium includes all kinds of recording apparatuses storing data that can be read by a processor. Examples of the processor-readable recording medium is ROM, RAM, CD-ROM, magnetic tapes, floppy disks, optical data storage apparatuses, and, including those that are implemented in the form of carrier waves such as data transmission through the Internet. In addition, the processor-readable recording medium is dispersed in computer systems connected through a network, so that the processor-readable code can be stored and executed in a distributed fashion.

In addition, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. An image display apparatus comprising:
a display;
a network interface unit that performs communication through a network; and
a controller,
wherein the controller:
checks an electronic program guide (EPG) for an expected end time of content to be output through the display,
outputs the content through the display,
obtains frame data of the content output through the display at a first time point at a preset time prior to the expected end time,
determines a corresponding playback time point at which a screen corresponding to the frame data is scheduled to be output by checking the frame data from a metadata,
calculates a difference between the determined playback time point at which the screen corresponding to the frame data is scheduled to be output and the checked expected end time of the content,
calculates an actual end time point of the content by adding the calculated difference to the first time point at which the frame data was obtained, and
outputs a user interface (UI) recommending at least one product related to the content, at the calculated actual end time point, through the display.

2. The image display apparatus of claim 1, wherein the controller captures a screen output through the display at the first time point, and obtains a hash value of an image corresponding to the captured screen as the frame data.

3. The image display apparatus of claim 1, further comprising a storage unit for storing database for use history of user,
wherein the controller determines a recommendation criteria for at least one of a type of the product, detailed information, manufacturer, and related person, based on the database, and determines at least one product related to the content, based on the recommendation criteria.

4. The image display apparatus of claim 3, wherein the controller outputs a first UI including at least one image corresponding to a playback time point to which a product related to the content is mapped, through the display, at the calculated actual end time point,
  outputs a frame of the content at a playback time point corresponding to the selected image, through the display, when a user input for selecting one of the images included in the first UI is received, and
  outputs a second UI including information on at least one product mapped to a playback time point corresponding to the selected image, through the display, along with the frame of the content.

5. The image display apparatus of claim 4, wherein if there exists a thumbnail output through the display for a certain time or more among thumbnail images of product output through the second UI, the controller adds data including at least one of a type of product, detailed information, manufacturer, and related person corresponding to the thumbnail output for the certain time or more, to the database.

6. The image display apparatus of claim 3, wherein the controller receives a first metadata for the entire content from a server through the network interface unit,
  checks a first hash value corresponding to the frame data among hash values included in the first metadata, and
  calculates the actual end time point, based on a playback time point corresponding to the first hash value.

7. The image display apparatus of claim 6, wherein the first metadata comprises data for entire products related to the content,
  wherein the controller determines a product corresponding to the recommendation criteria among products included in the first metadata, as a product related to the content.

8. The image display apparatus of claim 3, wherein the controller transmits a signal including the frame data to a server through the network interface unit,
  receives a second metadata, corresponding to the frame data, for a part of the content from the server through the network interface, and
  calculates the actual end time point, based on a playback time point corresponding to the second metadata.

9. The image display apparatus of claim 8, wherein the controller transmits a signal including the recommendation criteria to the server through the network interface unit,
  receives a third metadata including data for a product corresponding to the recommendation criteria from the server through the network interface unit, and
  determines a product included in the third metadata as a product related to the content.

10. A method of operating an image display apparatus, the method comprising:
  checking an electronic program guide (EPG) for an expected end time of content to be output through a display of the image display apparatus;
  outputting the content through the display;
  obtaining frame data for of the content output through the display at a first time point at a preset time prior to the expected end time;
  determining a corresponding playback time point at which a screen corresponding to the frame data is scheduled to be output by checking the frame data from a metadata;
  calculating a difference between the determined playback time point at which the screen corresponding to the frame data is scheduled to be output and the checked expected end time of the content;
  calculating an actual end time point of the content by adding the calculated difference to the first time point at which the frame data was obtained; and
  outputting a user interface (UI) recommending at least one product related to the content, at the calculated actual end time point, through the display.

11. The method of claim 10, wherein obtaining the frame data comprises capturing a screen output through the display at the first time point, and obtaining a hash value of an image corresponding to the captured screen as the frame data.

12. The method of claim 10, further comprising:
  determining a recommendation criteria for at least one of a type of product preferred by a user, detailed information, a manufacturer, and a used actor, based on database for use history of the user; and
  determining at least one product related to the content, based on the recommendation criteria.

13. The method of claim 12, wherein outputting a user interface (UI) further comprises:
  outputting a first UI including at least one image corresponding to a playback time point to which a product related to the content is mapped, at the calculated actual end time point;
  outputting a frame of the content at a playback time point corresponding to the selected image, when a user input for selecting one of the images included in the first UI is received; and
  outputting a second UI including information on at least one product mapped to a playback time point corresponding to the selected image, along with the frame of the content.

14. The method of claim 13, further comprising, if there exists a thumbnail output through the display for a certain time or more among thumbnail images of product output through the second UI, adding data including at least one of a type of product, detailed information, a manufacturer, and a used actor corresponding to the thumbnail output for the certain time or more, to the database.

15. The method of claim 12, wherein calculating an actual end time point comprises: receiving a first metadata for the entire content from a server through a network interface unit of the image display apparatus; checking a first hash value corresponding to the frame data among hash values included in the first metadata; and calculating the actual end time point, based on a playback time point corresponding to the first hash value.

16. The method of claim 15, wherein the first metadata comprises data for entire products related to the content,
  wherein determining at least one product related to the content comprises determining a product corresponding to the recommendation criteria among products included in the first metadata, as a product related to the content.

17. The method of claim 12, wherein determining at least one product related to the content comprises:
  transmitting a signal including the frame data to a server through a network interface unit of the image display apparatus;
  receiving a second metadata, corresponding to the frame data, for a part of the content from the server through the network interface; and
  calculating the actual end time point, based on a playback time point corresponding to the second metadata.

18. The method of claim 17, wherein determining at least one product related to the content comprises:
- transmitting a signal including the recommendation criteria to the server through the network interface unit;
- receiving a third metadata including data for a product corresponding to the recommendation criteria from the server through the network interface unit; and
- determining a product included in the third metadata as a product related to the content.

* * * * *